United States Patent
Shin et al.

(10) Patent No.: US 10,700,415 B2
(45) Date of Patent: Jun. 30, 2020

(54) ANTENNA OF ELECTRONIC DEVICE INCLUDING DISPLAY

(71) Applicant: Samsung Electronics Co., Ltd., Gyeonggi-do (KR)

(72) Inventors: Dong Ryul Shin, Daegu (KR); Young Gwon Koo, Seoul (KR); Ho Saeng Kim, Gyeonggi-do (KR); Jin Woo Jung, Seoul (KR); Jae Bong Chun, Gyeonggi-do (KR); Hyun Suk Choi, Daegu (KR)

(73) Assignee: Samsung Electronics Co., Ltd (KR)

( * ) Notice: Subject to any disclaimer, the term of this patent is extended or adjusted under 35 U.S.C. 154(b) by 360 days.

(21) Appl. No.: 15/443,822

(22) Filed: Feb. 27, 2017

(65) Prior Publication Data

US 2017/0250460 A1 Aug. 31, 2017

(30) Foreign Application Priority Data

Feb. 26, 2016 (KR) .................. 10-2016-0023548

(51) Int. Cl.
*H01Q 1/24* (2006.01)
*H04M 1/02* (2006.01)
(Continued)

(52) U.S. Cl.
CPC ........... *H01Q 1/243* (2013.01); *G06F 1/1626* (2013.01); *G06F 1/1637* (2013.01);
(Continued)

(58) Field of Classification Search
CPC ........ H01Q 1/243; H01Q 13/10; H01Q 21/28; H01Q 1/52
(Continued)

(56) References Cited

U.S. PATENT DOCUMENTS 6,014,121 A * 1/2000 Aratani .................. G06T 3/4015
345/87
6,992,627 B1 * 1/2006 Honda ................... H01Q 1/243
343/700 MS
(Continued)

FOREIGN PATENT DOCUMENTS

CN 101682119 3/2010
CN 102570027 7/2012
(Continued)

OTHER PUBLICATIONS

International Search Report dated Jun. 5, 2017 issued in counterpart application No. PCT/KR2017/002018, 12 pages.
(Continued)

*Primary Examiner* — Huedung X Mancuso
(74) *Attorney, Agent, or Firm* — The Farrell Law Firm, P.C.

(57) ABSTRACT

An electronic device is provided, which includes a housing including a first plate, a second plate, and a side plate surrounding part of a space between the first plate and the second plate, a display positioned inside the housing and exposed through the first plate, a first conductive plate attached to or integrated into the display, wherein the first conductive plate faces the first direction and includes a first periphery extending along the side plate, a second conductive plate facing the third direction, wherein the second conducive plate includes a second periphery extending along the first periphery and a portion of the second periphery is coupled to the first periphery, and a wireless communication circuit electrically connected to the second conductive plate and configured to use at least one of the first conductive plate or the second conductive plate as an antenna element.

20 Claims, 17 Drawing Sheets

(51) Int. Cl.
*H01Q 21/28* (2006.01)
*H01Q 13/10* (2006.01)
*G06F 1/16* (2006.01)

(52) U.S. Cl.
CPC ........... *G06F 1/1698* (2013.01); *H01Q 13/10* (2013.01); *H01Q 21/28* (2013.01); *H04M 1/0266* (2013.01); *H04M 1/0277* (2013.01)

(58) Field of Classification Search
USPC ....................................................... 343/702
See application file for complete search history.

(56) References Cited

U.S. PATENT DOCUMENTS

| | | | |
|---|---|---|---|
| 7,469,135 B2 | 12/2008 | Lin | |
| 7,612,725 B2 | 11/2009 | Hill et al. | |
| 7,804,451 B2 | 9/2010 | Glocker et al. | |
| 7,843,396 B2 | 11/2010 | Hill et al. | |
| 7,924,231 B2 | 4/2011 | Hill et al. | |
| 8,085,202 B2 | 12/2011 | Ayatollahi et al. | |
| 8,169,374 B2 | 5/2012 | Hill et al. | |
| 8,836,587 B2 | 9/2014 | Darnell et al. | |
| 8,872,706 B2 | 10/2014 | Caballero et al. | |
| 8,907,852 B2 | 12/2014 | Hill et al. | |
| 8,933,842 B2 | 1/2015 | Ayatollahi et al. | |
| 9,001,002 B2 | 4/2015 | Montevirgen et al. | |
| 9,059,520 B2 | 6/2015 | Bungo | |
| 9,130,261 B2 * | 9/2015 | Chang | H01Q 9/0421 |
| 9,153,874 B2 | 10/2015 | Ouyang et al. | |
| 9,170,659 B2 * | 10/2015 | Kim | G06F 1/1637 |
| 9,342,105 B2 * | 5/2016 | Choi | G06F 1/1637 |
| 9,356,355 B2 | 5/2016 | Hill et al. | |
| 9,480,174 B2 * | 10/2016 | Park | G06F 1/1652 |
| 9,502,752 B2 | 11/2016 | Darnell et al. | |
| 9,596,330 B2 | 3/2017 | Caballero et al. | |
| 9,705,180 B2 | 7/2017 | Darnell et al. | |
| 9,749,450 B2 * | 8/2017 | Chu | H04M 1/0283 |
| 9,819,382 B2 * | 11/2017 | Fathollahi | H04M 1/0202 |
| 9,882,269 B2 | 1/2018 | Hill et al. | |
| 10,396,434 B2 | 8/2019 | Koo et al. | |
| 2003/0156074 A1 * | 8/2003 | Ranganathan | G06F 1/3203 345/1.1 |
| 2006/0139216 A1 | 6/2006 | Glocker et al. | |
| 2008/0074330 A1 | 3/2008 | Lin | |
| 2008/0150813 A1 | 6/2008 | Yung-Sen | |
| 2008/0316115 A1 | 12/2008 | Hill et al. | |
| 2010/0007564 A1 | 1/2010 | Hill et al. | |
| 2010/0238072 A1 | 9/2010 | Ayatollahi et al. | |
| 2011/0050513 A1 | 3/2011 | Hill et al. | |
| 2011/0183721 A1 | 7/2011 | Hill et al. | |
| 2011/0215990 A1 * | 9/2011 | Liesenberg | G09G 5/00 345/1.3 |
| 2012/0046002 A1 | 2/2012 | Hill et al. | |
| 2012/0068905 A1 | 3/2012 | Ayatollahi et al. | |
| 2012/0112969 A1 * | 5/2012 | Caballero | H01Q 1/243 343/702 |
| 2013/0082883 A1 | 4/2013 | Montevirgen et al. | |
| 2013/0194143 A1 | 8/2013 | Bungo | |
| 2013/0257659 A1 | 10/2013 | Darnell et al. | |
| 2013/0278872 A1 * | 10/2013 | Teller | G02B 3/0037 349/96 |
| 2014/0049432 A1 | 2/2014 | Hill et al. | |
| 2014/0104762 A1 | 4/2014 | Park | |
| 2014/0266938 A1 | 9/2014 | Ouyang et al. | |
| 2014/0313086 A1 | 10/2014 | Montevirgen et al. | |
| 2015/0005037 A1 | 1/2015 | Caballero et al. | |
| 2015/0035706 A1 | 2/2015 | Darnell et al. | |
| 2015/0253835 A1 * | 9/2015 | Yu | G06F 1/3206 713/323 |
| 2015/0286457 A1 * | 10/2015 | Kim | G06F 3/1446 345/581 |
| 2015/0364813 A1 | 12/2015 | Darnell et al. | |
| 2015/0370112 A1 * | 12/2015 | Sawabe | G02F 1/133351 349/73 |
| 2016/0056527 A1 * | 2/2016 | Pascolini | G06K 9/00006 343/702 |
| 2016/0248148 A1 | 8/2016 | Hill et al. | |
| 2017/0207516 A1 | 7/2017 | Koo et al. | |
| 2017/0244153 A1 * | 8/2017 | Chen | H01Q 1/243 |
| 2018/0166809 A1 * | 6/2018 | Brogan | H01R 12/714 |
| 2018/0253178 A1 * | 9/2018 | Ueyama | G02F 1/13338 |

FOREIGN PATENT DOCUMENTS

| | | |
|---|---|---|
| CN | 204809404 | 11/2015 |
| CN | 106992360 | 7/2017 |
| EP | 2 624 363 | 8/2013 |
| JP | 2005-538655 | 12/2005 |
| KR | 1020130022177 | 3/2013 |

OTHER PUBLICATIONS

European Search Report dated Sep. 26, 2018 issued in counterpart application No. 17756835.9-1221, 10 pages.

Chinese Office Action dated Aug. 29, 2019 issued in counterpart application No. 201780004544.7, 18 pages.

* cited by examiner

ANTENNA OF ELECTRONIC DEVICE INCLUDING DISPLAY

PRIORITY

This application claims priority under 35 U.S.C. § 119(a) to Korean Patent Application Serial No. 10-2016-0023548, which was filed in the Korean Intellectual Property Office on Feb. 26, 2016, the entire disclosure of which is incorporated herein by reference.

BACKGROUND

1. Field of the Disclosure

The present disclosure relates generally to an antenna of an electronic device including a display.

2. Description of the Related Art

An electronic device, e.g., a smartphone or a tablet, supporting wireless communication includes an antenna. The electronic device may transmit and receive signals of a specific frequency band using a metallic body disposed within the electronic device or defining an external appearance of the electronic device as a radiator.

For an operation of the antenna, a metallic body may be used as a ground area of the antenna, in addition to being used as the radiator. A ground layer in a substrate of the electronic device may also correspond to a ground area of the antenna.

The electronic device may include a display panel for a display. When a display function is implemented, noise may occur in a display driving circuit, such as a display driving integrated chip (DDIC). Therefore, in order to prevent the noise from interfering with the operations of the internal parts of the electronic device, a shielding metal sheet may be disposed on a rear surface of the display panel.

However, when an entire front surface of the electronic device is implemented as a display, the radiation performance of the antenna may be degraded by the shielding metal sheet. For example, because the electronic device in which the display does not cover the entire front surface thereof may use an existing side metal frame as an antenna radiator and provide marginal spaces at upper and lower ends thereof, the radiation using the metal frames located at the upper and lower ends is hardly influenced. However, in an electronic device in which the display covers the entire front surface thereof, such that marginal spaces are not provided at upper and lower ends thereof, the radiation performance of the antenna may be lowered by the display (or a conductive material such as a rear metal sheet of the display).

SUMMARY

The present disclosure is made to address at least the above-mentioned problems and/or disadvantages and to provide at least the advantages described below.

Accordingly, an aspect of the present disclosure is to provide an electronic device that utilizes a front display structure as an antenna element, wherein an entire front surface of the electronic device is implemented as a display.

In accordance with an aspect of the present disclosure, an electronic device is provided, which includes a housing including a first plate facing a first direction, a second plate facing a second direction that is opposite to the first direction, and a side plate facing a third direction that is perpendicular to the first direction and surrounding a portion of a space between the first plate and the second plate, a display positioned inside the housing and exposed through the first plate, a first conductive plate attached to the display or integrated into the display, wherein the first conductive plate faces the first direction and includes a first periphery extending along the side plate, a second conductive plate facing the third direction. The second conducive plate includes a second periphery extending along the first periphery and a portion of the second periphery is coupled to the first periphery, and a wireless communication circuit electrically connected to the second conductive plate, wherein the wireless communication circuit is configured to use at least one of the first conductive plate and the second conductive plate as an antenna element.

In accordance with an aspect of the present disclosure, an electronic device is provided, which includes a cover window defining a front housing of the electronic device and at least a portion of a side housing of the electronic device; a flexible display panel disposed under the cover window, wherein the flexible display panel includes a first panel area corresponding to the front housing and a second panel area corresponding to at least a portion of the side housing; a conductive member including a first conductive plate disposed at a location corresponding to the first panel area of the display panel, a second conductive plate disposed at a location corresponding to the second panel area of the display panel, and a connection area connecting the first conductive plate and the second conductive plate only in a partial area; a flexible printed circuit board (FPCB) physically and electrically contacting the first plate and the second plate and for feeding electric power to the second conductive plate; and a wireless communication circuit electrically connected to the FPCB. The wireless communication circuit is configured to use a slot defined by the second conductive plate, the connection area, and the first conductive plate as an antenna element.

In accordance with an aspect of the present disclosure, an electronic device is provided, which includes a cover window defining a front housing of the electronic device; a display panel disposed under the cover window, wherein the display panel includes a first panel area having a first width and a first height and a second panel area having a second width and a second height; a conductive member including a first conductive plate disposed at a location corresponding to the first panel area of the display panel, a second conductive plate disposed at a location corresponding to the second panel area of the display panel, and a connection area connecting the first conductive plate and the second conductive plate only in an area; a flexible printed circuit board (FPCB) physically and electrically contacting the first plate and the second plate and for feeding electric power to the second conductive plate; and a wireless communication circuit electrically connected to the FPCB. The wireless communication circuit is configured to use a slot defined by the second conductive plate, the connection area, and the first conductive plate as an antenna element.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
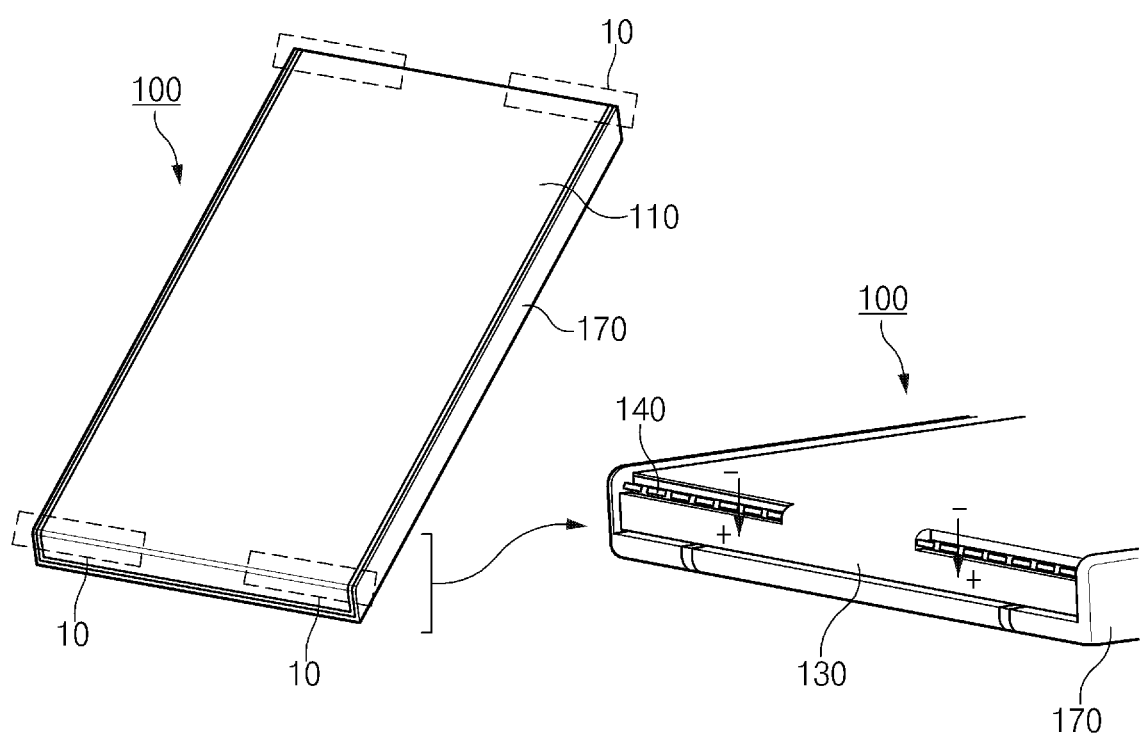
FIG. 1 illustrates an electronic device according to an embodiment of the present disclosure.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components, elements, features, and structures may be marked by similar reference numerals.

FIG. 1 illustrates an electronic device according to an embodiment of the present disclosure.

Referring to FIG. 1, the electronic device 100, e.g., a smartphone, a tablet, etc., has a parallelepiped shape with a specific volume or a shape that is similar to a parallelepiped shape. Although the front surface and the rear surface of the electronic device 100 are implemented by flat planar surfaces, all or some (e.g., two side left and right surfaces) of the four side surfaces of the electronic device 100 may be implemented to have a specific curvature to improve a grip feeling.

The housing, which constitutes an external appearance of the electronic device 100, may be classified into a front surface, a rear surface, and side surfaces. For example, the housing of the electronic device 100 may include a first plate facing a first direction (a front surface, +z direction), a second plate facing a second direction (a rear surface, −z direction) that is opposite to the first direction, and a side plate facing a third direction (a side surface, ±x or ±y direction) that is perpendicular to the first direction (or the second direction) or substantially perpendicular to the first direction (or the second direction). The side plate may surround a space between the first plate and the second plate. The side plate, for example, may be implemented to be planar or curved.

Each of the first, second, and third plates may correspond to one component or a group of components. For example, the first plate may correspond to a glass cover, the second plate may correspond to an injection-molded ring or one or more side metal frames classified by insulation members, and the third plate may correspond to a rear cover. Alternatively, one or more components may constitute each of the first, second, and third plates, or one component may be disposed in two or more areas of each of the first, second, and third plates. Accordingly, in the present disclosure, the terms of a first plate, a second plate, and a third plate are not to be construed such that one plate corresponds only to one element.

In FIG. 1, the electronic device 100 includes a cover window 110 and a rear case 170. The cover window 110 may be bent from one surface of the electronic device 100. For example, the cover window 110 is bent from a periphery of an upper surface or a lower surface of the electronic device 100. The cover window 110 and the rear surface case 170 define a front surface (e.g., the first plate) and a rear surface (e.g., the second plate) of the electronic device 100, respectively.

Alternatively, the cover window 110 may be bent from a left side surface, a right side surface, or at least one of a plurality of surfaces defining an external shape of the electronic device 100, or the cover window 110 may be disposed only on a front surface of the electronic device 100.

A portion of the rear case 170 is expanded to a side surface of the electronic device 100. As illustrated in FIG. 1, the rear case 170 constitutes the left and right side plates of the electronic device 100. The remaining part of the rear case 170, except for an area of the rear case 170 corresponding to the left and right side plates of the electronic device 100, or an area of the rear case 170 corresponding to upper and lower side plates of the electronic device 100, may be implemented by an insulation material such as plastic.

Alternatively, a portion of the rear case 170 may constitute a portion of upper and/or lower side plates of the electronic device 100. An area of the rear case 170 corresponding to the upper and lower side plates may be implemented by a conductive material, such as a metal frame. The metal frame may be operated as an antenna radiator. However, the entire rear case 170 may be implemented by plastic or metal.

In FIG. 1, the upper and lower side plates of the electronic device 100 are formed by the cover window 110 and the rear case 170. However, as an alternative, a side plate may be formed by only the rear case 170 or by only the cover window 110.

The electronic device 100 may be designed such that at least one of corner areas 10 radiate electromagnetic waves for wireless communication. For example, a conductive plate 130, such as a copper (Cu) sheet, which is integrated into the display panel or attached to the display panel, may have a structure of a leftward/rightward slot while being bent at a location corresponding to the corner area 10.

Figure 2A:
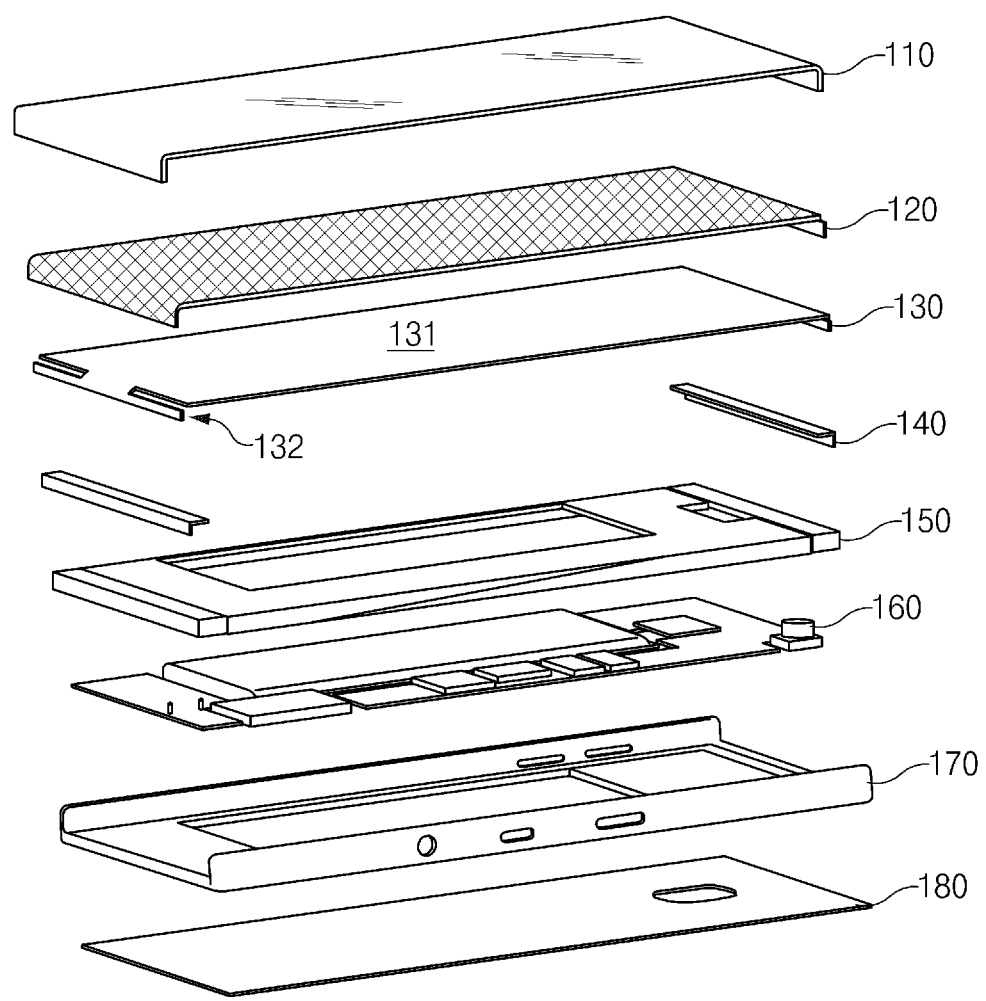
FIG. 2A is an exploded perspective view of the electronic device illustrated in FIG. 1.

As illustrated in FIG. 2A, the conductive plate 130 may include a first conductive plate 131 and a second conductive plate 132. The first conductive plate 131 may face a front surface (a first direction) like the cover window 110, and the second conductive plate may face a side surface (a third direction, +y direction) like the lower side plate. The first conductive plate 131 may include a first periphery extending along the lower side plate, and the second conductive plate 132 may include a second periphery extending along the first periphery. A portion of the second periphery may be coupled to the first periphery, such that two slots may be defined in one corner by the first periphery, the second periphery, and a connection area. Alternatively, one slot or three or more slots may be formed in one corner by varying the locations, the sizes, and the number of the connection areas.

An FPCB 140 is disposed under the conductive plate 130. The conductive plate 130 may be electrically connected to a wireless communication circuit through the FPCB 140. For example, when the wireless communication circuit supplies electric power to the second conductive plate 132 through the FPCB 140, at least a portion of the first conductive plate 131 and/or the second conductive plate 132 may be used as an antenna element. For example, if electric power is supplied at one point of the FPCB 140, the electronic device 100 may transmit and receive signals of a specific frequency band, based on an electrical path defined by the second conductive plate 132, the connection area, and the first conductive plate 131. According to the lengths of the slots defined by the first periphery, the second periphery, and the connection area, the electronic device 100 may transmit and receive signals of different frequency bands, based on the slots.

FIG. 2A is an exploded perspective view of the electronic device illustrated in FIG. 1.

Referring to FIG. 2A, a display panel 120 is disposed under the front cover window 110 of the electronic device 100. The display panel 120 has a shape corresponding to the cover window 110. For example, the display panel 120 may be implemented by a flexible (or deformable) display panel for a shape corresponding to the cover window 110. When the cover window 110 defines at least a portion (e.g., an upper surface and a lower surface) of a side housing of the electronic device 100 and a front housing, the display panel 120 may also include a front display area and areas expanded to upper and lower ends thereof, as illustrated in FIG. 2A. The areas expanded to the upper and lower ends of the display panel 120 may include an area for display. Alternatively, the display panel 120 may include an area that may be displayed only on a front surface thereof, and upper and lower ends of the display panel 120 may correspond to non-display areas, such as black matrices.

The display panel 120 may include a plurality of layers. For example, when the display panel 120 corresponds to an organic light emitting diode (OLED), it may include a thin film transistor (TFT)/OLED layer, an encapsulation glass layer, and a polarizer. When the display panel 120 corresponds to a liquid crystal display (LCD), it may sequentially include a back light unit (BLU), a polarizer, glass, a TFT/electrode layer, a liquid crystal, a color filter, and a polarizer. When the display panel 120 supports a touch function, a touch panel may be additionally provided. The display panel 120 may also referred to as a display 120.

The conductive plate 130 (e.g., a copper sheet) implemented by a conductive member for blocking noise that occurs when the display panel 120 is driven is disposed under the display panel 120. A planar surface of the conductive plate 130 may be attached to the display panel 120 or may be integrated into the display panel 120. Further, the conductive plate 130 may have a shape that is the same as or similar to that of the display panel 120. For example, when the display panel 120 is bent at upper and lower ends thereof and a front area and upper end/lower end areas thereof are physically connected to each other as illustrated in FIG. 2A, the conductive plate 130 may also include a first conductive plate 131 corresponding to the front area, a second conductive plate 132 corresponding to the lower end area, and a third conductive plate corresponding to the upper end area.

The conductive plates corresponding to the areas may be connected to each other by a connection area having a specific width. The connection area may provide an electrical path facing a ground area GND when the second conductive plate 132 is used as a portion of an antenna radiator or an antenna element. Alternatively, the areas corresponding to the conductive plate 130 may not be physically connected to each other, and a plurality of physically spaced areas may be included in the conductive plate 130. In this case, the separated areas may be electrically connected to each other by an electrical path provided by the FPCB 140 disposed under the conductive plate 130.

The conductive plate 130 may have a front area and at least one side area. For example, the conductive plate 130 may include a first conductive plate 131 disposed parallel to the first plate of the electronic device 100 or the front surface of the display panel 120, a connection area bent while extending only at a portion of the periphery of the first conductive plate 131, and a second conductive plate 132 physically and electrically connected to the first conductive plate 131 by the connection area.

The first conductive plate 131 and the second conductive plate 132 may define a specific angle, e.g., 90 degrees, and in this case, the second conductive plate 132 may be disposed substantially parallel to the side surface of the electronic device 100. Alternatively, the electronic device 100 may include a side display having a specific inclination (e.g., 30 degrees), the second conductive plate 132 may be disposed parallel to the side display, i.e., may be disposed to define the specific angle (i.e., 30 degrees) together with the first conductive plate 131. Hereinafter, unless not specifically mentioned, it will be assumed that the first conductive plate 131 and the second conductive plate 132 of the conductive plate 130 are perpendicular to each other.

A conductive material, such as the FPCB 140, may contact the conductive plate 130. The FPCB 140 may include a first planar portion facing a side surface (e.g., a third direction) and a second planar portion facing the front surface (e.g., the first direction). The first planar portion of the FPCB 140 may physically and electrically contact the second conductive plate 132, and the second planar portion may physically and/or electrically contact the first conductive plate 131. Further, the FPCB 140 may include a conductive line and/or a conductive pattern providing an electrical connection between the second conductive plate 132 and the wireless communication circuit.

For the durability and coupling stability of the antenna, the FPCB 140 may be attached to the first conductive plate 131 and the second conductive plate 132 of the conductive plate 130 while contacting the first conductive plate 131 and the second conductive plate 132 of the conductive plate 130. When the second conductive plate 132 is used as a first antenna radiator, a metallic body extending from at least a portion of the FPCB 140 or one point of the FBCB 140 may be used as a second antenna radiator. For example, an antenna radiator having an electrical path defined by the FPCB 140 and the second conductive plate 130 may be implemented. In this case, the first conductive plate may provide a ground area for an antenna.

The electronic device 100 may include an insulation member, such as a bracket 150, which may provide a space, in which a printed circuit board (PCB) of the electronic device 100, and/or an application processor (AP), a memory, and electrical components 160, such as sensors, which are mounted on the PCB may be mounted, and may support electrical components 160 to be fixed in place. The shape of the bracket 150 may be variously modified based on the structure of the electronic device 100. The bracket 150 may have an opening or a hole in which various components are mounted or through which a connection member is inserted. The connection member may include a C-clip or a pogo pin for physically or electrically connecting a substrate (e.g., the PCB) and components (e.g., the FPCB 140) vertically or horizontally spaced apart from the substrate.

The rear case 170 may prevent the electrical components 160 from being exposed, when the rear cover 180 is removed. For example, when the rear cover 180 is removed from the electronic device 100, only a battery and a SIM card may be exposed. Alternatively, the rear case 170 and the rear cover 180 may be integrally implemented. For example, in a smartphone, in which a battery cannot be removed by the user, the rear case 170 and the rear cover 180 may be integrally formed.

Figure 2B:
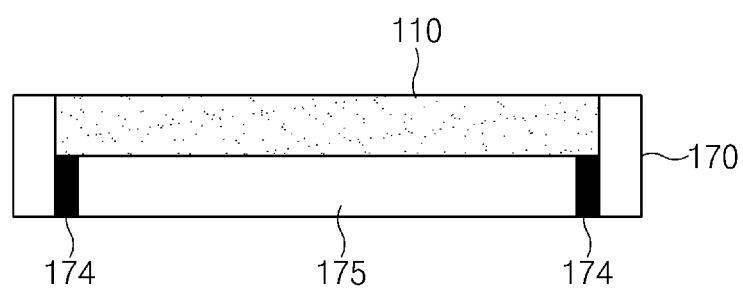
FIG. 2B illustrates an upper end and/or a lower end of the electronic device illustrated in FIG. 1.

FIG. 2B illustrates an upper end and/or a lower end of the electronic device illustrated in FIG. 1.

Referring to FIG. 2B, the cover window 110 extends from the front surface of the electronic device 100 to an upper end area and/or a lower end area of the electronic device 100. When the rear case 170 of the electronic device 100 includes a metal, the rear case 170 includes an insulator 174 that partitions an area of an antenna radiator from the other areas, such that an area 175 of the rear case may be used as the antenna radiator at an upper end area or a lower end area of the electronic device 100. An area of the antenna radiator distinguished from the other areas by the insulator 174 may be used to transmit and receive a signal of a targeted frequency band. As the targeted frequency band changes, the insulator 174 may be disposed at a location that is different from that of FIG. 2B.

Although FIG. 2B illustrates a metal frame that constitutes a housing of an upper end or a lower end of the electronic device 100 and is used as an antenna radiator, the cover window 110 may extend to the left and right side surfaces of the electronic device 100. In this case, similarly to the above-mentioned example, metal areas of the left and right side surfaces, which are partitioned by insulator 174, may be utilized as antenna radiators.

Figure 2C:
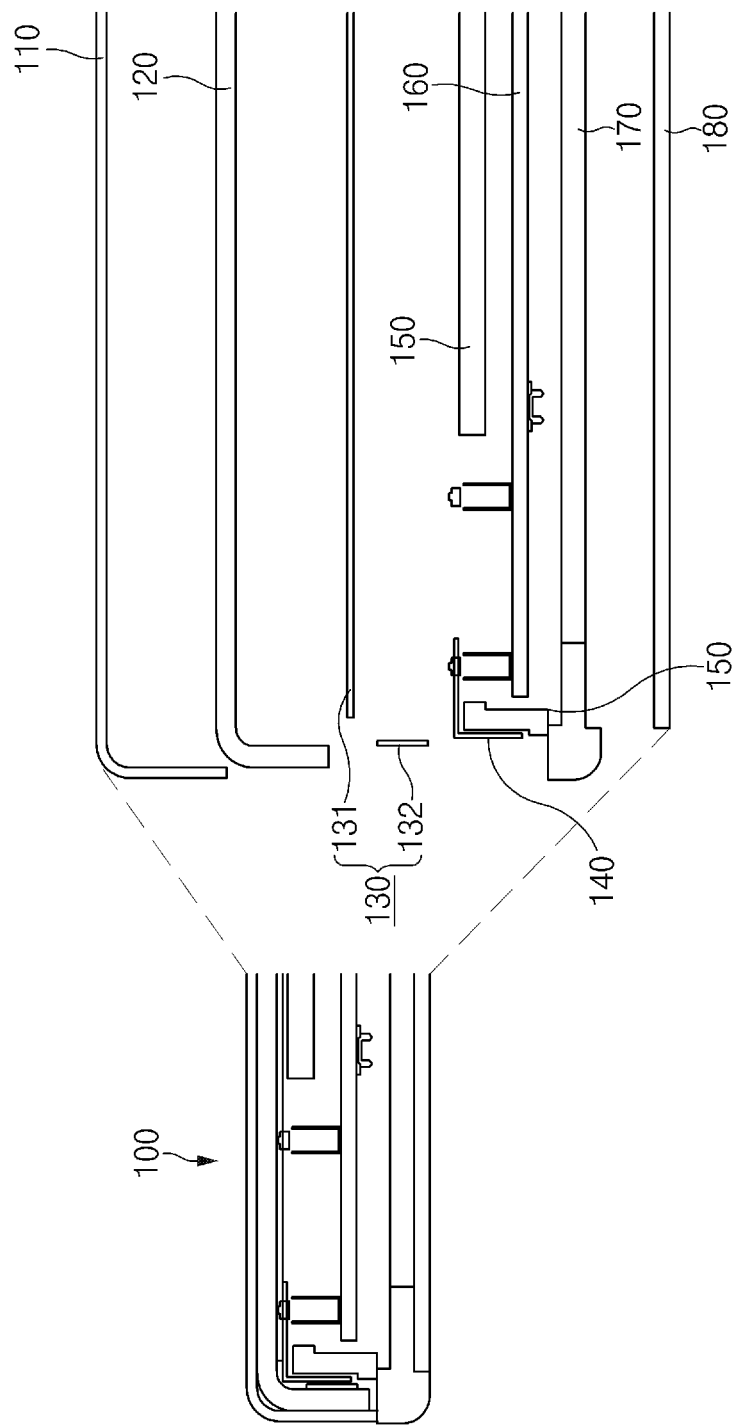
FIG. 2C illustrates a sectional view and an exploded perspective view of the electronic device illustrated in FIG. 1.

FIG. 2C illustrates a sectional view and an exploded perspective view of the electronic device illustrated in FIG. 1.

Referring to FIG. 2C, the cover window 110 defines a front surface and portions of side surfaces of the electronic device 100. The display panel 120 attaches to the cover window 110 and is disposed on the front surface and the side surfaces of the electronic device 100. The conductive plate 130 is disposed under the display panel 120.

More specifically, the first conductive plate 131 is attached to an area corresponding to the front surface of the display panel 120, and the second conductive plate 132 is attached to an area corresponding to a side surface of the display panel 120. When the first conductive plate 131 and the second conductive plate 132 are physically separated from each other, two or more conductive plates are disposed under the display panel 120. If the second conductive plate 132 is bent at one end of the first conductive plate 131, one conductive plate 130 may be disposed under the display panel 120.

The first conductive plate 131 and the second conductive plate 132 may be bonded to the FPCB 140, e.g., using a conductive tape interposed between the first conductive plate 131 and/or the second conductive plate 132, and the FPCB 140.

The FPCB 140 may be connected to the electrical components 160. For example, the bracket 150 may be disposed between the FPCB 140 and the electrical components 160, and the FPCB 140 and the electrical components 160 may be electrically connected to each other through a connection member located in a hole provided in the bracket 150. A portion of the FPCB 140 may be disposed between a side wall or a side surface of the bracket 150 and the second conductive plate 132. For example, when the FPCB 140 includes a first planar portion coupled to the first conductive plate 131 and a second planar portion coupled to the second conductive plate 132, the second planar portion may be disposed between a side wall of the bracket 150 and the second conductive plate 132. Further, the side wall of the bracket 150 and the second planar portion of the FPCB 140 may be spaced apart from each other by a specific gap.

The communication circuit (e.g., a communication processor (CP) or a radio frequency (RF) module) may be electrically connected to the FPCB 140 and the second conductive plate 132. The communication circuit may feed electric power to the electrical path defined by the FPCB 140 and the second conductive plate 132. The first conductive plate 131 connected to the FPCB 140 or connected to at least one point of the second conductive plate 132 may be utilized as a ground area of the antenna. Accordingly, the electronic device 100 may stably receive a signal of a targeted frequency band by using the second conductive plate 132 and the FPCB 140 as an antenna radiator and using the wide ground area of the first conductive plate 131.

A non-display area may be located at a corner portion (curved portion) of the display panel 120. For example, a non-display area in which a driving circuit unit for driving the display panel 120, a backlight lamp, and black matrices are disposed may be disposed from a corner portion to a side surface area extending from the corner portion. All of the corner and side surface areas (a second panel area) of the display panel 120, except for a backlight unit (BLU) for outputting a color or a first panel area in which content is output, may correspond to a non-display area. The display panel 120 may be divided into a first panel area corresponding to the front surface of the electronic device and a second panel area corresponding to a side surface of the electronic device or corresponding to the remaining area, except for the first panel area. Content may be output from the first panel area and the second panel area may correspond to a non-display area.

If the corner portion of the display panel 120 corresponds to a non-display area, electromagnetic waves may be smoothly radiated by the slot structure of the conductive plate 130 located under the corner portion of the display panel 120. For example, electromagnetic waves may be radiated through the corner area 10 by the slot structure defined by the first conductive plate 131, the second conductive plate 132, and the connection area connecting the first conductive plate 131 and the second conductive plate 132.

Alternatively, the non-display area may be formed under the corner portion, i.e., in a side area. That is, the first panel area of the display panel 120, in which content is output, may extend to the front surface and an area of a side surface of the electronic device 100. In this case, electromagnetic waves may be radiated through the slot structure, by expanding the first conductive plate 131 such that the first conductive plate 131 corresponds to the first panel area and moving the slot structure to a location corresponding to the non-display area (e.g., the second panel area) formed in the side surface area.

FIGS. 3A to 3D illustrate different examples of a conductive plate according to various embodiments of the present disclosure.

As described above, the conductive plate is not necessarily limited to a metal plate. For example, the conductive plate 130 may be a conductive layer. Further, the conductive plate 130 may be implemented by a conductive cover sheet. The conductive plate 130 may be replaced by a first conductive member, and the FPCB 140 may be replaced by a second conductive member.

Figure 3A:
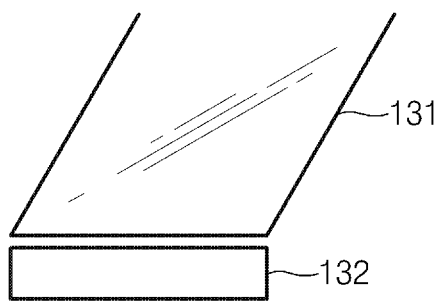
FIGS. 3A to 3D illustrate different examples of a conductive plate according to various embodiments of the present disclosure.

Referring to FIG. 3A, the first conductive plate 131, i.e., a first area 131, corresponds to the front area of the electronic device 100. Further, the second conductive plate 132, i.e., a second area 132, is disposed at a specific angle (e.g., 90 degrees) to the first area 131. The first area 131 and the second area 132 may be electrically connected to each other via an FPCB.

Figure 3B:
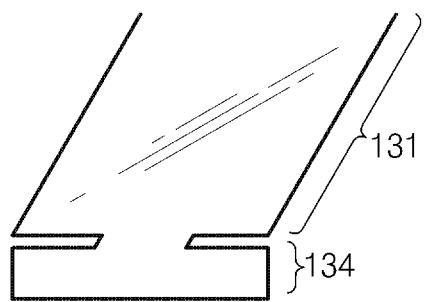

Referring to FIG. 3B, the first area 131 and a second area 134 are connected to each other. Specifically, the second area 134 is bent from one end of the first area 131. The bent area may have a width that is the same as that of the first area 131, or may have a width that is smaller than that of the first area 131, as illustrated. Further, the second area 134 may have a width corresponding to that of the first area 131, or may have a width that is smaller than that of the first area 131. The first area 131 and the second area 134 may have sizes and forms corresponding to a shape of the display panel 120.

Figure 3C:
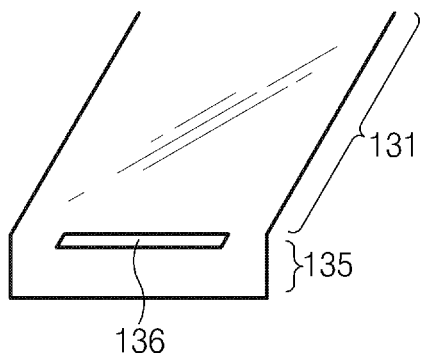

Referring to FIG. 3C, the first area 131 and a second area 135 are connected to each other at two points of the conductive plate. In this case, the conductive plate includes a slit type opening 136. The second area 135 may be operated as a slot antenna or a slit antenna based on a location of the feeding provided by an FPCB electrically contacts the conductive plate.

Figure 3D:
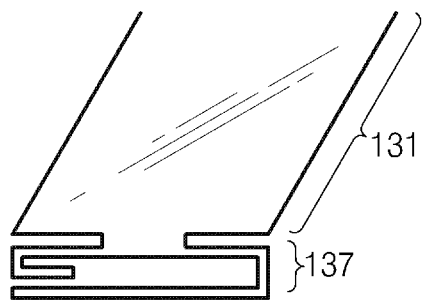

Referring to FIG. 3D, a second area 137 includes a pattern for receiving a signal of one or more frequency bands. For example, the second area 137 may include one or more branch having different electrical path lengths. A branch having a relatively short path may be adapted to receive a signal of a high frequency band, and a branch having a relatively long path may be adapted to receive a signal of a low frequency band.

Various other examples of a conductive plate may be provided. For example, a slit antenna that is similar to that of FIG. 3C may be implemented by coupling the first area 131 and the second area 132 of FIG. 3A to the FPCB 140 having a suitable shape. Further, the shapes of FIGS. 3B to 3D may be implemented directly by the structure or shape of the conductive plate 130, or may be implemented by the structure or shape formed through coupling of the conductive plate 130 and the FPCB 140.

Figure 4:
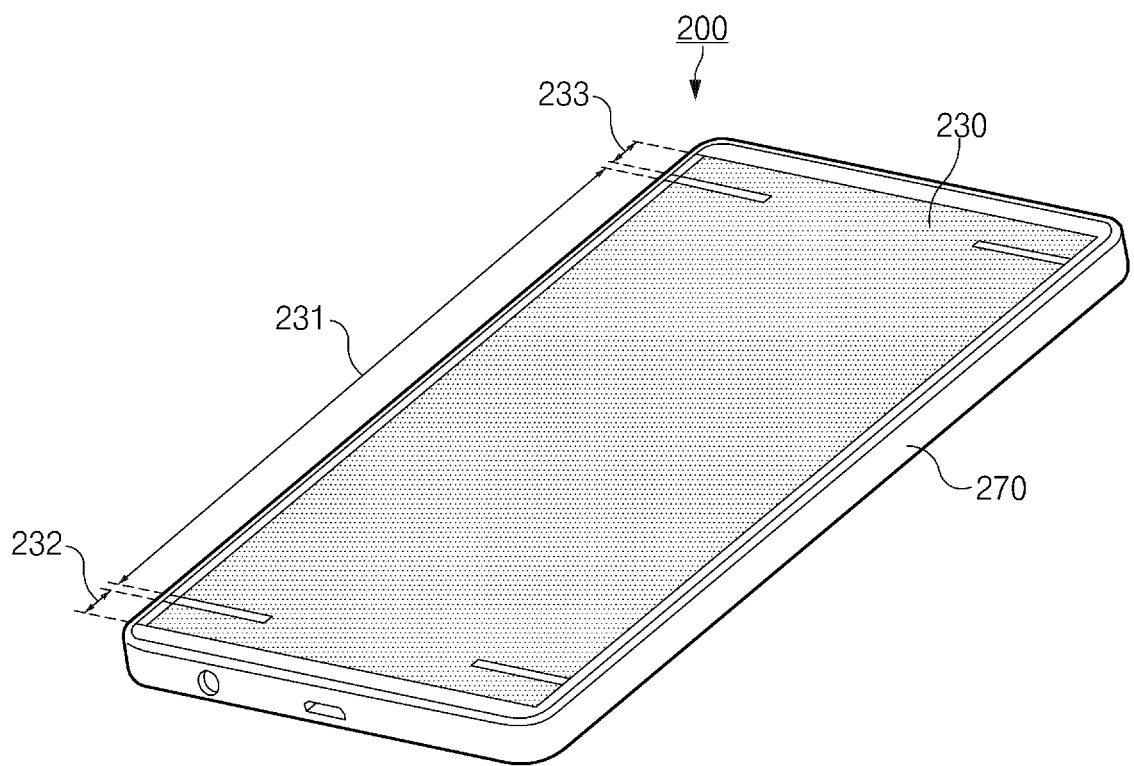
FIG. 4 illustrates an electronic device according to an embodiment of the present disclosure.

FIG. 4 illustrates an electronic device according to an embodiment of the present disclosure. Unlike the electronic device 100 of FIG. 1, a display panel 220 (as illustrated in FIG. 5) of the electronic device 200 of FIG. 4 does not extend to a side surface of the electronic device 200, but covers the entire area of the front surface.

Referring to FIG. 4, a cover window 210 and a display panel 220 are removed from the electronic device 200, for convenience of description. The electronic device 200 includes a conductive plate 230, which includes a first conductive plate 231 located at a central portion thereof, a second conductive plate 232 located at a lower end thereof, a third conductive plate 233 located at an upper end thereof, and a connection area electrically connecting the conductive plates. The conductive plate 230 may be implemented by one conductive sheet including a total of four slots, each of which has an opened side, two slots being formed at each of an upper end and a lower end of the conductive plate 230. However, as described above, the number, the forms, and the lengths of the slot structures formed in the conductive plate 230 may be various modified.

When radiation of an antenna is implemented only at a lower end of the electronic device 200, the slot structure part of an upper end of the electronic device 200 may be replaced by a conductor. That is, the first conductive plate 231 and the third conductive plate 233 may be implemented by one rectangular plate without using a slot structure at an intermediate portion thereof.

Figure 5:
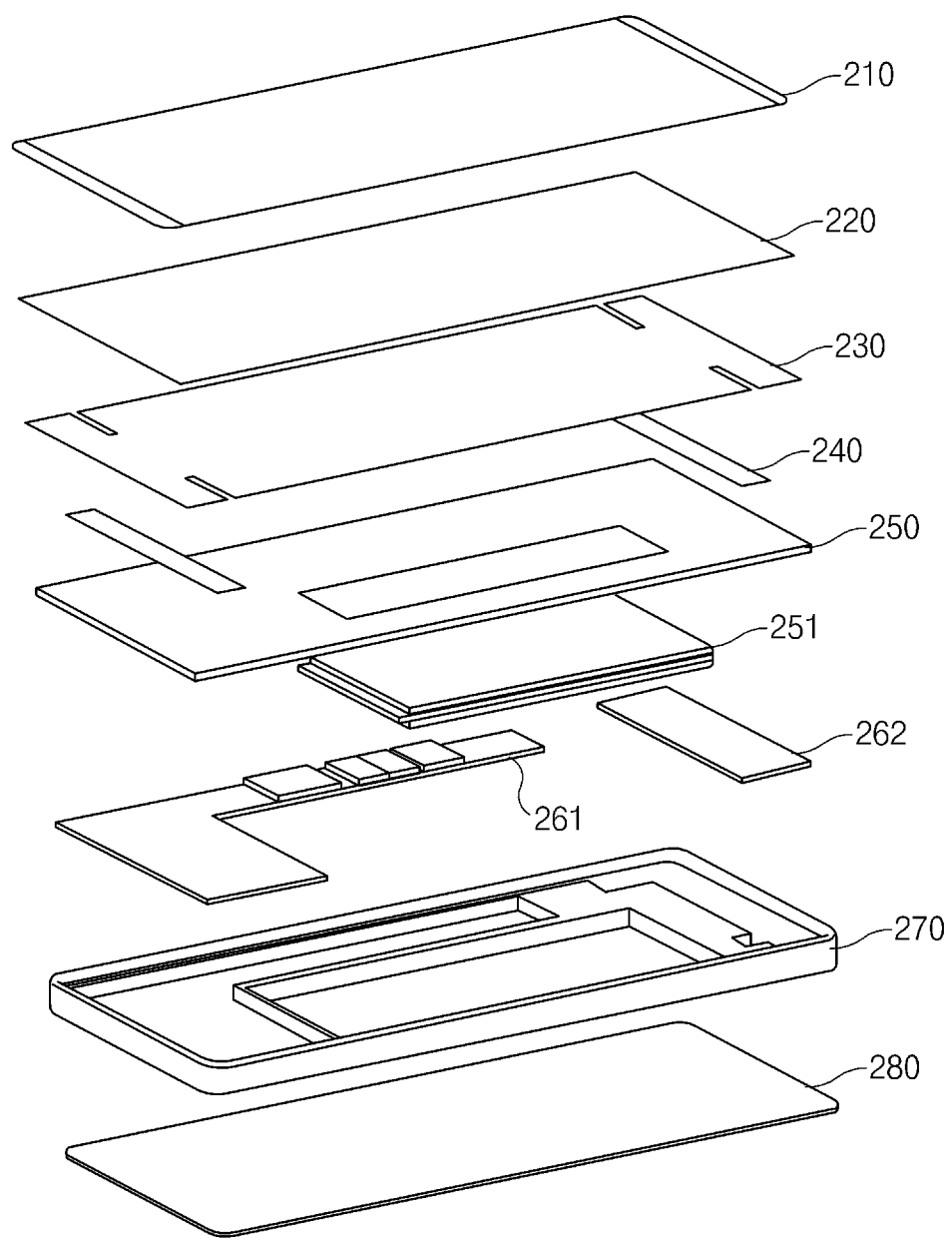
FIG. 5 is an exploded perspective view of the electronic device illustrated in FIG. 4.

FIG. 5 is an exploded perspective view of the electronic device illustrated in FIG. 4. In the following description of FIG. 5, detailed descriptions of the elements that are the same as or similar to or correspond to the above-described elements in FIG. 2A will be omitted.

Referring to FIG. 5, the electronic device 200 includes a front cover window 210. The cover window 210 may correspond to an enhanced glass cover configured to protect the entire front surface of the electronic device 200 without extending to a side surface of the electronic device 200.

A display panel 220 is disposed under the front cover window 210. The display panel 220 may be implemented by a flat panel, like the cover window 210. Alternatively, the display panel 220 may be implemented by a flexible display panel in which a portion of an upper end and/or a lower end of the display panel 220 is bent over the side surface of the electronic device 200 to output content on the entire front surface of the electronic device 200.

The electronic device includes a conductive plate 230 integrated into the display panel 220 or attached under the display panel 220. For example, similarly to the conductive plate 130 of the electronic device 100, the conductive plate 230 includes a first conductive plate 231 corresponding to a central area thereof, a second conductive plate 232 corresponding to a lower end area thereof, and a third conductive plate 233 corresponding to an upper end area thereof. The conductive plates 231 to 233 corresponding to the areas may be connected to each other by a connection area having a specific width.

Unlike the conductive plate 130 of the electronic device 100, the conductive plate 230 may have plates on the same plane. Accordingly, unlike in the electronic device 100 in which a substrate disposed under the conductive plate 130 is implemented by the FPCB 140, the substrate disposed under the conductive plate 230 may be implemented by a general PCB, as well as an FPCB. Hereinafter, it will be assumed that the FPCB 240 is disposed under the conductive plate 230.

The electronic device 200 includes an insulation member, i.e., a bracket 250. The bracket 250 provides a space in which a battery 251, a first PCB 261, a second PCB 262, or other electrical components, such as sensors and parts, which are mounted on a PCB, and may function to support the electrical components such that the electrical components, are fixed in place.

The rear case 270 may prevent electrical components from being exposed when the rear cover 280 is removed. Alternatively, the rear case 270 and the rear cover 280 may be integrally implemented.

Figure 6:
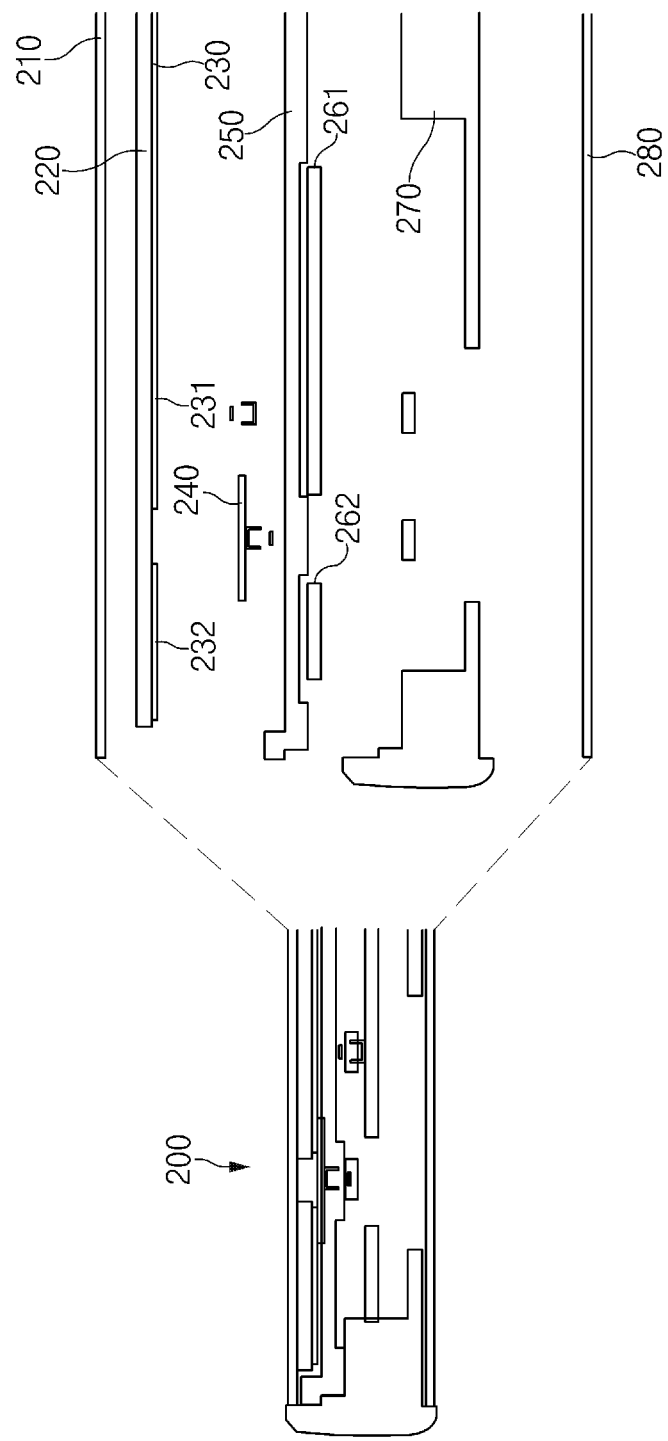
FIG. 6 illustrates a sectional view and an exploded perspective view of the electronic device illustrated in FIG. 4.

FIG. 6 illustrates a sectional view and an exploded perspective view of the electronic device illustrated in FIG. 4. The elements and description of FIG. 6, which are the same as, similar to, or correspond to the above-described elements and description of FIG. 3, will be omitted.

Referring to FIG. 6, the cover window 210 may define a front surface of the electronic device 200. The display panel 220 is disposed under the cover window 210. The conductive plate 230 is disposed under the display panel 220.

The first conductive plate 231 and the second conductive plate 232 may be bonded to the FPCB 240. As illustrated in FIG. 6, because the FPCB 240 does not need to have a flexible property, i.e., because it is flat, it may be replaced by another material such as a planar PCB.

The FPCB 240 may be connected to the first PCB 261 and/or the second PCB 262. For example, the FPCB 240 and the PCBs 261 and 262 may be electrically connected to each other through a connection member located in a hole provided in the bracket 250.

The display panel 220 may be divided into a plurality of areas to correspond to the structure of the conductive plate 230 disposed under the display panel 220. For example, the display panel 220 may be logically divided into a first panel area, a second panel area, and a third panel area.

The first panel area, for example, may correspond to a central area of the display panel 220 corresponding to the first conductive plate 231. The first panel area may output an execution screen (e.g., an image, a video, a webpage, or a game screen) of a main application. The first panel area may have a first width and a first height. The first width and the first height may satisfy a specific ratio, e.g., a screen ratio of 16:9.

The second panel area may correspond to a lower end area of the display panel 220 corresponding to the second conductive plate 232. The second panel area may output a status bar, a notification bar, a quick menu, and/or a control menu of an application executed in the first panel area. The second panel area may have a first width that is the same as that of the first panel area and a second height that is shorter than that of the first panel area. Similarly, the third panel area may have a first width, and a second height or a third height that is slightly longer or shorter than the second height. Alternatively, the third panel area may be omitted. Further, the display panel 220 may further include a logically divided fourth panel area or additional panel areas.

The first panel area and the second panel area may be spaced apart from each other by a gap. The location of the gap may correspond to the location of the slot structure of the conductive plate 230. That is, the first panel area and the second panel area may be spaced apart from each other by a gap between a periphery of the first conductive plate 231 and a periphery of the second conductive plate 232, or a gap that is slightly larger or smaller than the gap between the periphery of the first conductive plate 231 and the periphery of the second conductive plate 232.

The above-described spacing between the panel areas does not necessarily mean physical separation of the display panel 220.

The driving circuit configured to drive the display panel 220 may not output content in an area corresponding to the gap, that is, in a thin area of the display panel 220 corresponding to the spacing between the first panel area and the second panel area. For example, the pixel density of the area of the display panel 220 corresponding to the gap may be set to be lower than the pixel area of the first panel area or the second panel area of the display panel 220. The driving circuit may be disposed such that a BLU of the area corresponding to the gap is always turned off to be viewed in black, or only a black matrix may be disposed in the gap without using a BLU. The implementation of the display panel 220 may prevent the radiation performance of the antenna from being lowered by the display panel 220 or an output signal provided to the display panel 220 from being distorted by the radiation of the antenna.

The first panel area and the second panel area may be physically spaced apart from each other by a specific space.

Figure 7:
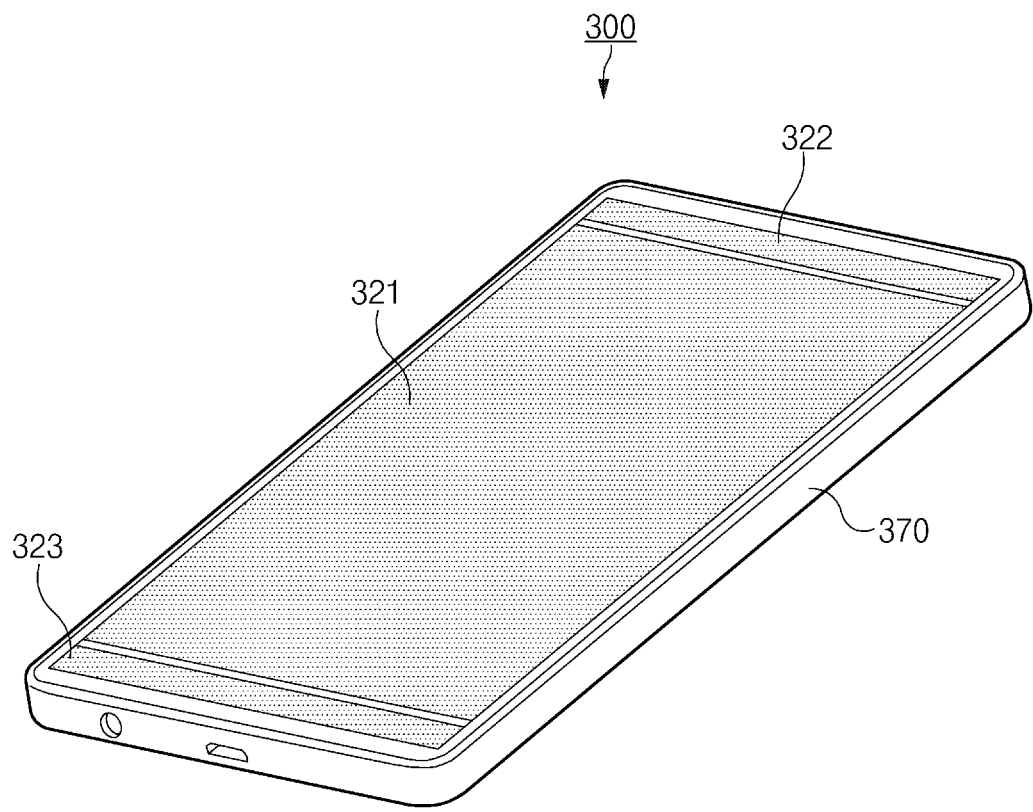
FIG. 7 illustrates an electronic device according to an embodiment of the present disclosure.

FIG. 7 illustrates an electronic device according to an embodiment of the present disclosure.

Referring to FIG. 7, a cover window 310 is removed from an electronic device 300, for convenience of description. The overall configuration of the electronic device 300 is similar to that of the electronic device 200, but unlike the electronic device 200 having only the display panel 220, the electronic device 300 includes a first display panel 321, a second display panel 322, and a third display panel 323, i.e., three physically divided display panels. The first display panel 321 may have a specific screen ratio (e.g., 16:9), and may correspond to a main display area, on which an execution screen of an application is displayed. The display panels of the electronic device 300 may be generally referenced by the display panel 320 (see FIG. 8). The display panel 320 includes a first panel area, a second panel area, and a third panel area corresponding to the first display panel 321, the second display panel 322, and the third display panel 323, respectively.

In order to drive the first display panel 321, the second display panel 322, and the third display panel 323, the electronic device 300 may include a first display driving circuit corresponding to the first panel area, and a second display driving circuit corresponding to the second panel area. The driving circuits may be electrically connected to the panel areas (the first display panel 321, the second display panel 322, and the third display panel 323), respectively. For example, the first display driving circuit may output an application execution screen on the first display panel 321, and the second display driving circuit may output specific screens, e.g., a notification bar, a status bar, and a quick menu, on the second display panel 322.

When the second panel area, i.e., the area corresponding to the second display panel 322 corresponds to a non-display area, such as a black matrix (or when a display is not implemented in the second panel area), a conductive plate (e.g., the second conductive plate 232) may be disposed in the non-display area. In this case, the wireless communication circuit may be electrically connected to the conductive plate through an FPCB, and an antenna configured to transmit and receive a signal of a frequency band corresponding to the electrical path formed by the connection may be implemented. When the third panel area or the whole part or a portion of the second panel area and the third panel area, as well as the second panel area correspond to a non-display area, a conductive plate may be disposed at a portion corresponding to the non-display area so that an antenna may be implemented.

Figure 8:
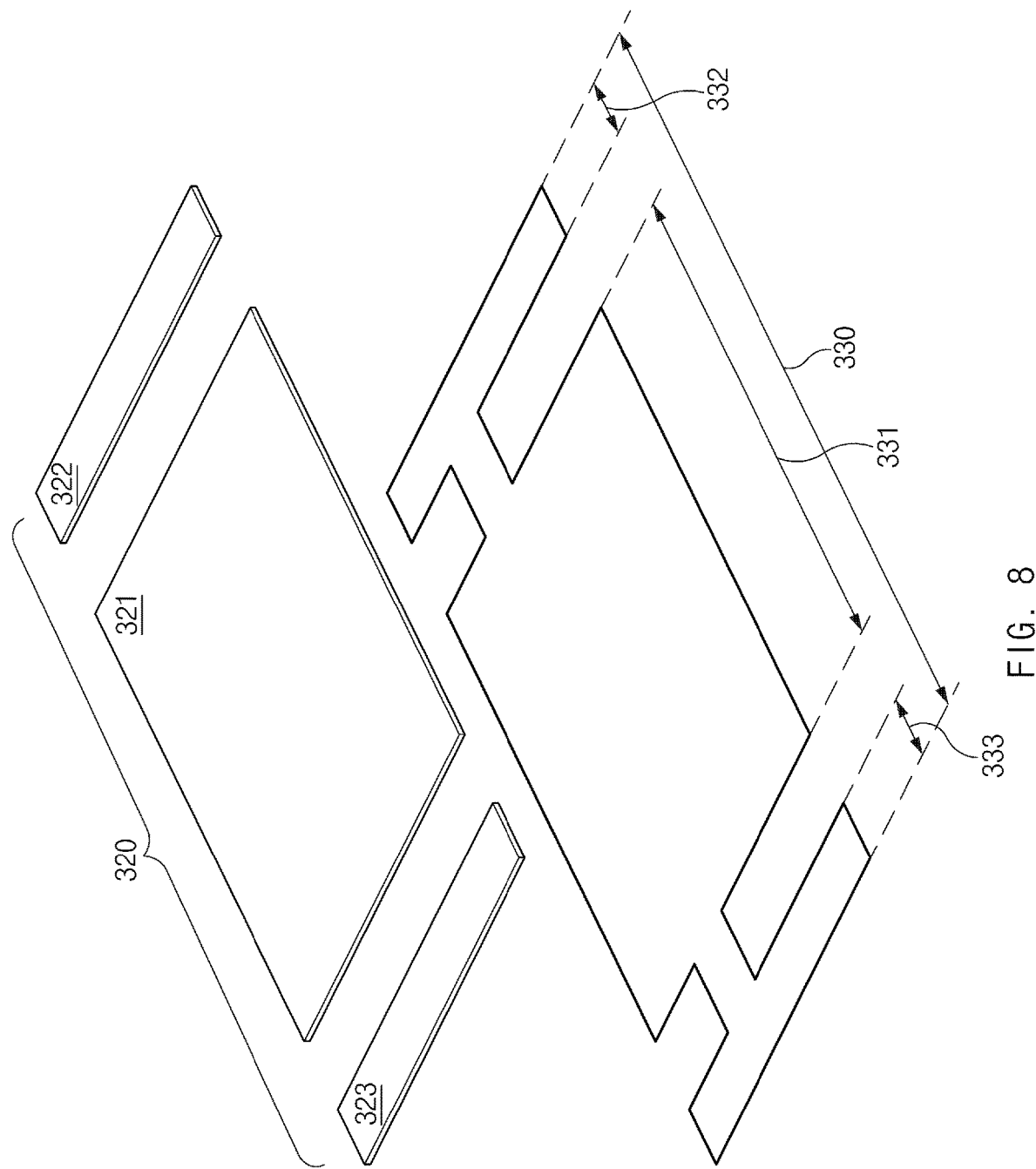
FIG. 8 illustrates display panels and a metal plate of the electronic device illustrated in FIG. 7.

FIG. 8 illustrates display panels and a metal plate of the electronic device illustrated in FIG. 7.

Referring to FIG. 8, the first display 321 and the second display panel 322 of the electronic device 300 may be spaced apart from each other by a specific space. The location of the gap may correspond to the location of the slot structure of the conductive plate 330. That is, the first display panel 321 and the second display panel 322 may be spaced apart from each other by a gap between a periphery of the first conductive plate 331 and a periphery of the second conductive plate 332, or a gap that is slightly larger or smaller than the gap between the periphery of the first conductive plate 331 and the periphery of the second conductive plate 332.

The space generated by the spacing between the display panels may prevent the radiation performance of the antenna from being lowered or an output signal provided to the display panel 320 from being distorted by the radiation of the antenna.

Figure 9:
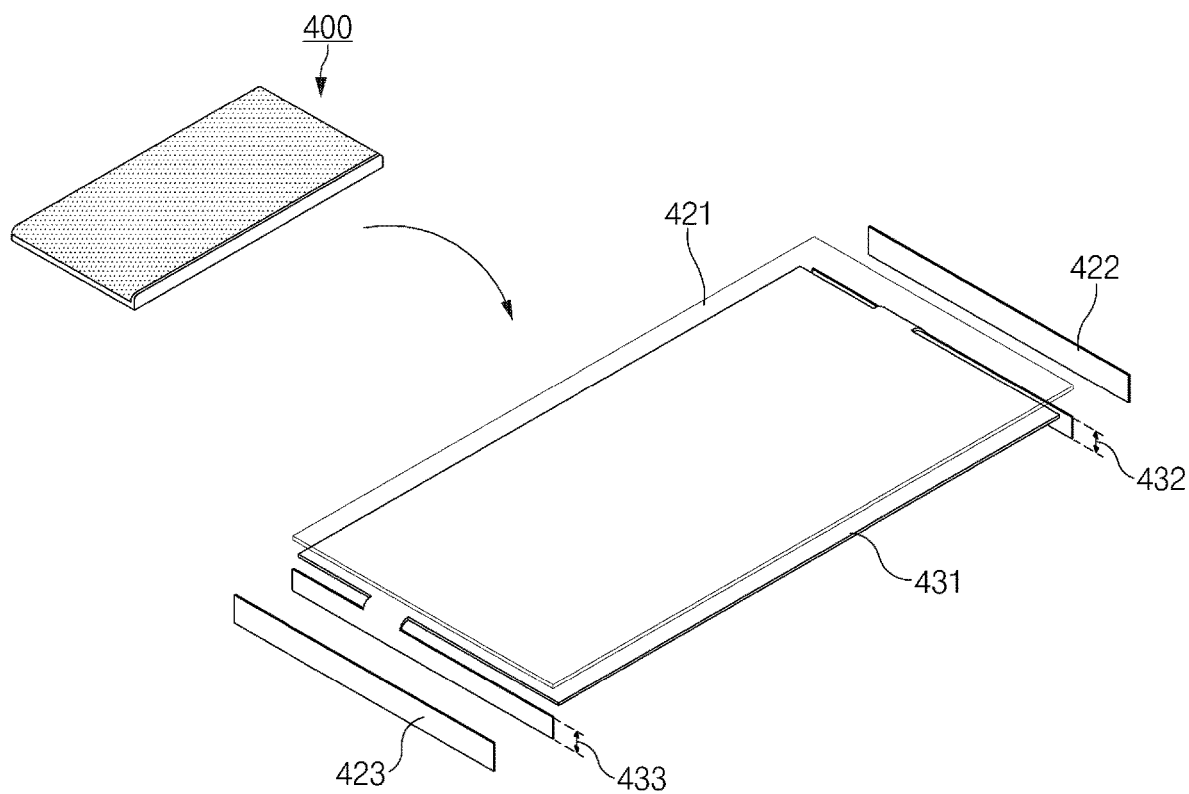
FIG. 9 illustrates an electronic device including a 3-surface display according to an embodiment of the present disclosure.

FIG. 9 illustrates an electronic device including a 3-surface display according to an embodiment of the present disclosure.

Referring to FIG. 9, the electronic device 400 includes a three-surface display corresponding to a front surface, an upper end surface, and a lower end surface thereof. For example, the electronic device 400 may include one flexible display panel bent at upper end and lower end corners of the electronic device 400, or may include three display panels (e.g., a first display panel 421, a second display panel 422, and a third display panel 423) that are physical divided.

A conductive plate may be disposed under the display panel(s). The conductive plate may include a first conductive plate 431, a second conductive plate 432, and a third conductive plate 433, and may have opened slot structures in the corner areas thereof.

An electronic device having a vertically expanded display, like the electronic device 400, may include an antenna using a non-conductive area between the front surface, and upper/lower end side surface display. The upper/lower end side surface conductive plate 432/433 utilized as an antenna radiator may be electrically connected to the front surface conductive plate 431. For example, feeding units may be constituted in the slot areas, i.e., the non-conductive areas by using the FPCB, and an antenna based on the electrical path formed around the slots may be implemented by feeding an RF signal to the conductive plate 432/433.

Figure 10:
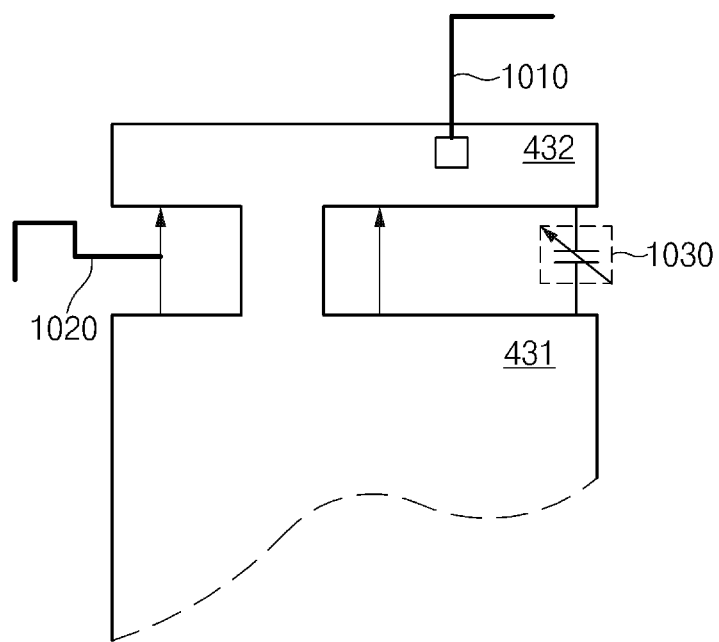
FIG. 10 illustrates an antenna including a 3-surface display according to an embodiment of the present disclosure.

FIG. 10 illustrates an antenna including a 3-surface display according to an embodiment of the present disclosure.

Referring to FIG. 10, electric power may be provided to the second conductive plate 432 in the non-conductive area (slot area) between the first conductive plate 431 and the second conductive plate 432. For example, electric power may be provided to the second conductive plate 432 by the FPCB disposed under the conductive plate 431 one or more times.

The electronic device 400 may also utilize an additional antenna radiator, as well as the second conductive plate 432. For example, the electronic device 400 may transmit and receive a signal of an additional frequency band through a first radiator 1010 electrically connected to the second conductive plate. The first radiator 1010 may be embodied as a metal frame constituting a portion of a side housing of the electronic device 400. Further, the electronic device 400 may transmit and receive a signal of an additional frequency band through a second radiator 1020 extending from a feeding path provided in the FPCB.

Further, a lumped element, such as a capacitor or an inductor, may be added between the first conductive plate 431 and the second conductive plate 432. For example, the length of an electrical path formed by the antenna structure of FIG. 10 may be made smaller by disposing a variable capacitor 1030 between the first conductive plate 431 and the second conductive plate 432. In contrast, the length of the electrical path may be made larger by disposing an inductor.

Figure 11A:
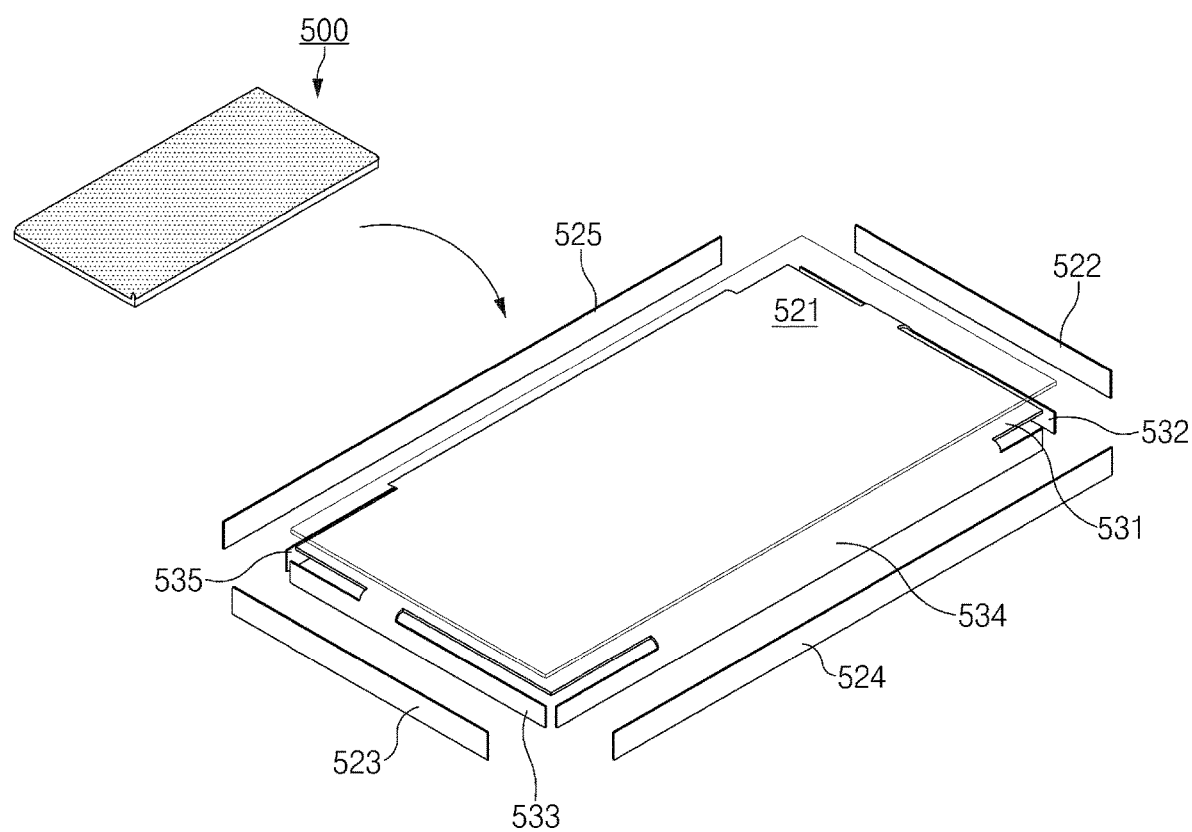
FIG. 11A illustrates an electronic device including a 5-surface display according to an embodiment of the present disclosure.

FIG. 11A illustrates an electronic device including a 5-surface display according to an embodiment of the present disclosure.

Referring to FIG. 11A, the electronic device 500 includes a five-surface display, i.e., a front surface and four side surfaces. For example, the electronic device 500 may include one flexible display panel bent at upper and lower end corners of the electronic device 500 and two separate display panels attached to side surfaces thereof, or may include five physically divided display panels (e.g., a first display panel 521, a second display panel 522, a third display panel 523, a fourth display panel 524, and a fifth display panel 525).

A conductive plate 530 may be disposed under the display panel(s). The conductive plate 530 may include a first conductive plate 531, a second conductive plate 532, a third conductive plate 533, a fourth conductive plate 534, and a fifth conductive plate 535, and may have opened slot structures in the corner areas thereof in a manner that is similar to the above-mentioned manner.

When the display extends leftwards and rightwards and upwards and downwards, as in the electronic device 500, an antenna may be constituted as described above. For example, an antenna may be constituted by utilizing a non-conductive area between the front surface and any one of the side displays. In this case, an antenna using a total of eight slots may be implemented.

The conductive plate 530 may have a structure that is not deflected from one side surface towards another side surface of the electronic device 500. For example, any one of the conductive plates 532, 533, 534, and 535 formed by extending the first conductive plate 531 to the four side surfaces may extend to another adjacent side surface. For example, the fourth conductive plate 534 may extend towards the third conductive plate 533. In this case, the length of the third conductive plate 533 may be smaller than that of FIG. 11. Through the modification, the electronic device 500 may receive a signal of a low frequency band by using the lengthened fourth conductive plate 534 and may receive a signal of a high frequency band by using the shortened third conductive plate 533.

Figure 11B:
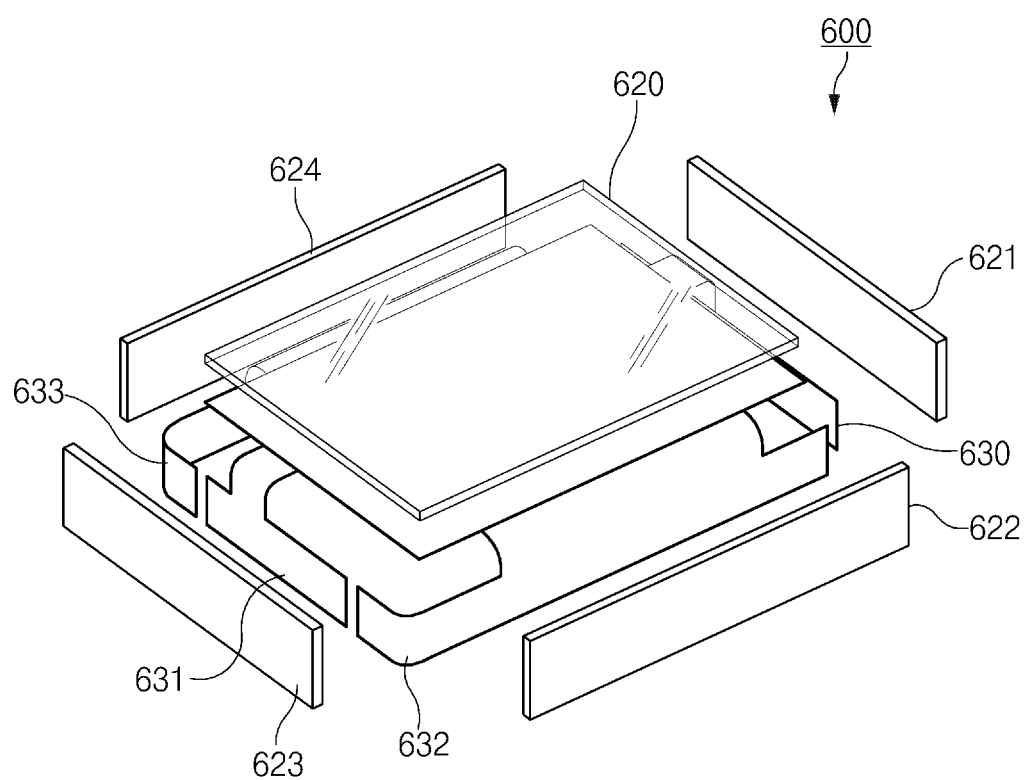
FIG. 11B illustrates an antenna structure of an electronic device including a plurality of side displays according to an embodiment of the present disclosure.

FIG. 11B illustrates an antenna structure of an electronic device including a plurality of side displays according to an embodiment of the present disclosure.

The electronic device 600 of FIG. 11B may have a configuration corresponding to the electronic device 500 of FIG. 11A. The front display panel 620 and the side display panels 621, 622, 623, and 624 of the electronic device 600 may correspond to the front display panel 521 and the side display panels 522, 523, 524, and 525 of the electronic device 500. Accordingly, the details that correspond to or are the same as or similar to those of FIG. 11A will be omitted below.

Referring to FIG. 11B, a conductive plate 630 is disposed under the display panels. The conductive plate 630 may be one conductive plate curved at the four sides thereof, and may include five conductive panels separately provided at the sides thereof.

The conductive plate 630 may have a structure curved form one surface to another surface thereof. For example, the conductive plate, which extends from the metal planar portion arranged under the front display panel 620 to the four sides, may extend to an adjacent another side. For example, the conductive plate area 632 formed at a location corresponding to the side display panel 632 may extend in the direction of another side display panel 623. Similarly, the conductive plate area 633 formed at a location corresponding to the side display panel 635 may also extend in the direction of the side display panel 623. In this case, the length of the conductive plate area 631 corresponding to the side display panel 623 may be smaller than that of the embodiment of FIG. 9. Through the modification, the electronic device 600 may receive a signal of a low frequency band by using the conductive plate area 632 or the conductive plate area 633, and may receive a signal of a high frequency band by using the conductive plate area 631. In this case, the planar conductive plate disposed under the display panel 620 may function as a ground area of the antenna.

Figure 12:
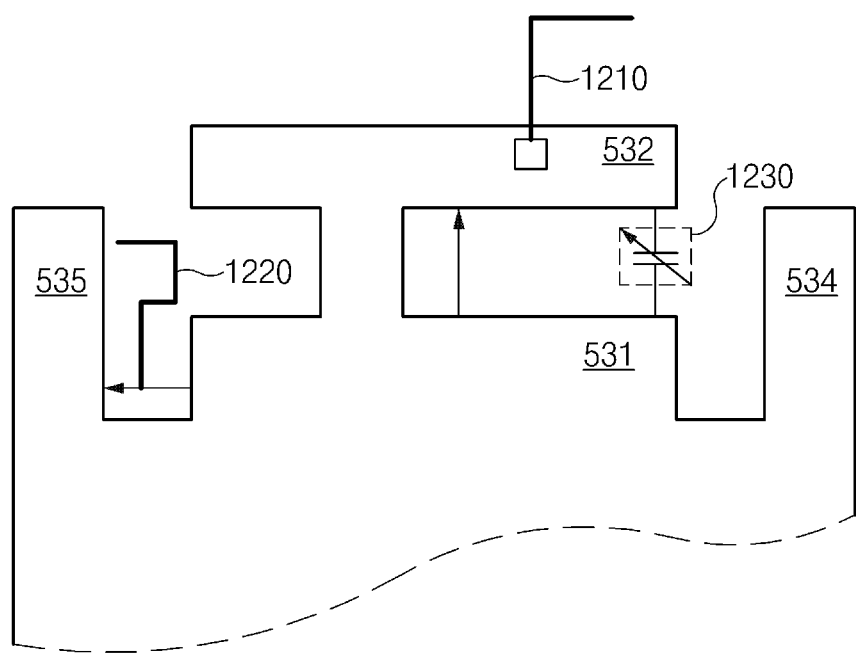
FIG. 12 illustrates an antenna structure of an electronic device including a 5-surface display according to an embodiment of the present disclosure.

FIG. 12 illustrates an antenna structure of an electronic device including a 5-surface display according to an embodiment of the present disclosure.

Referring to FIG. 12, electric power may be provided to the second conductive plate 532 in the non-conductive area (slot area) between the first conductive plate 531 and the second conductive plate 532. Electric power may be provided to the fifth conductive plate 535. For example, electric power may be provided to the second conductive plate 532 and the fifth conductive plate 535 by the FPCB disposed under the conductive plate 531 one or more times. Although separate electric power is not fed to the fourth conductive plate 534 in the example of FIG. 12, electric power may be indirectly fed (coupling feeding) to the fourth conductive plate 534 or may be fed to the fourth conductive plate 534 in another embodiment.

The electronic device 500 may utilize an additional antenna radiator, similar to that of FIG. 10. For example, the electronic device 500 may transmit and receive signals of an additional frequency band through a first radiator 1210 electrically connected to the second conductive plate 532. Further, the electronic device 500 may transmit and receive signals of an additional frequency band through a second radiator 1220 extending from a feeding path provided in the FPCB.

Further, a lumped element, such as a capacitor or an inductor, may be added between the first conductive plate 531 and the second conductive plate 532. For example, an electrical path formed by the antenna structure of FIG. 12 may be made shorter by disposing a variable capacitor 1230 between the first conductive plate 531 and the second conductive plate 532. The variable capacitor 1230 may be disposed in the FPCB 140 as in the exemplary FPCB 140 of FIG. 13. When the FPCB 140 in which the variable capacitor 1230 is disposed electrically connects the first conductive plate 531 and the second conductive plate 532, the variable capacitor 1230 may be disposed between one point of the first conductive plate 531 and one point of the second conductive plate 532 so that the first conductive plate 531 and the second conductive plate 532 may be electrically connected to each other. A command to control an element value of the variable capacitor 1230 may be delivered to the variable capacitor 1230 through a circuit line provided on a surface or in the interior of the FPCB 140.

Figure 13:
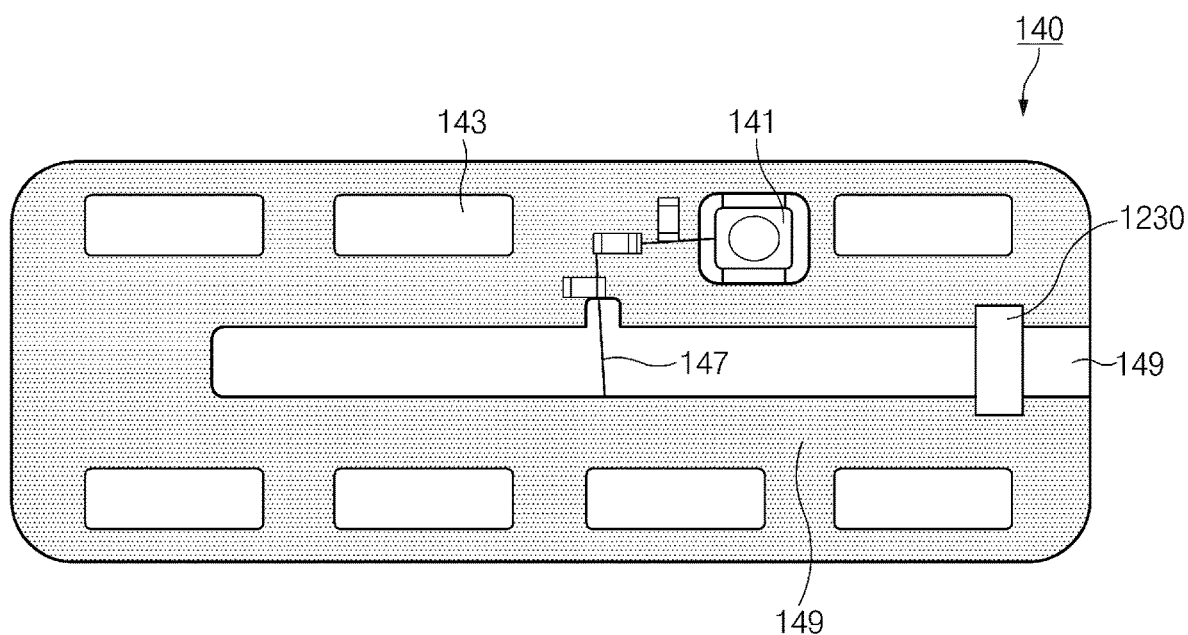
FIG. 13 conceptually illustrates a flexible printed circuit board (FPCB) connected to a conductive plate according to an embodiment of the present disclosure.

FIG. 13 conceptually illustrates an FPCB connected to a conductive plate according to an embodiment. For example, the FPCB 140 as illustrated in FIG. 2A may be bent to have a suitable shape for coupling the first conductive plate 131 and the second conductive plate 132 of the electronic device 100 and to be coupled to other components. Further, the FPCB 140 may be applied to the electronic device 200, the electronic device 300, the electronic device 400, and the electronic device 500, in addition to the electronic device 100, to which the technical spirit of the present disclosure may be applied, directly or after being modified.

Referring to FIG. 13, the FPCB 140 includes an RF transmitter/receiver circuit coupling area 141. A feeding path from an AP or a CP located on the PCB may be connected to the RF transmitter/receiver circuit coupling area 141 of the FPCB 140 through a connection member or the like. Electric power may be fed to the second conductive plate 132 through the feeding line 147, such as a conductive line or a conductive patter, which extends from the RF transmitter/receiver circuit coupling area 141.

The FPCB 140 may include an exposure area 143 for grounding. A plurality of exposure areas 143 may be provided, and at least some of the plurality of exposure areas 143 may be connected to the first conductive plate 131.

Another surface of the FPCB 140 may be implemented by a non-conductive area 149.

Figure 14:
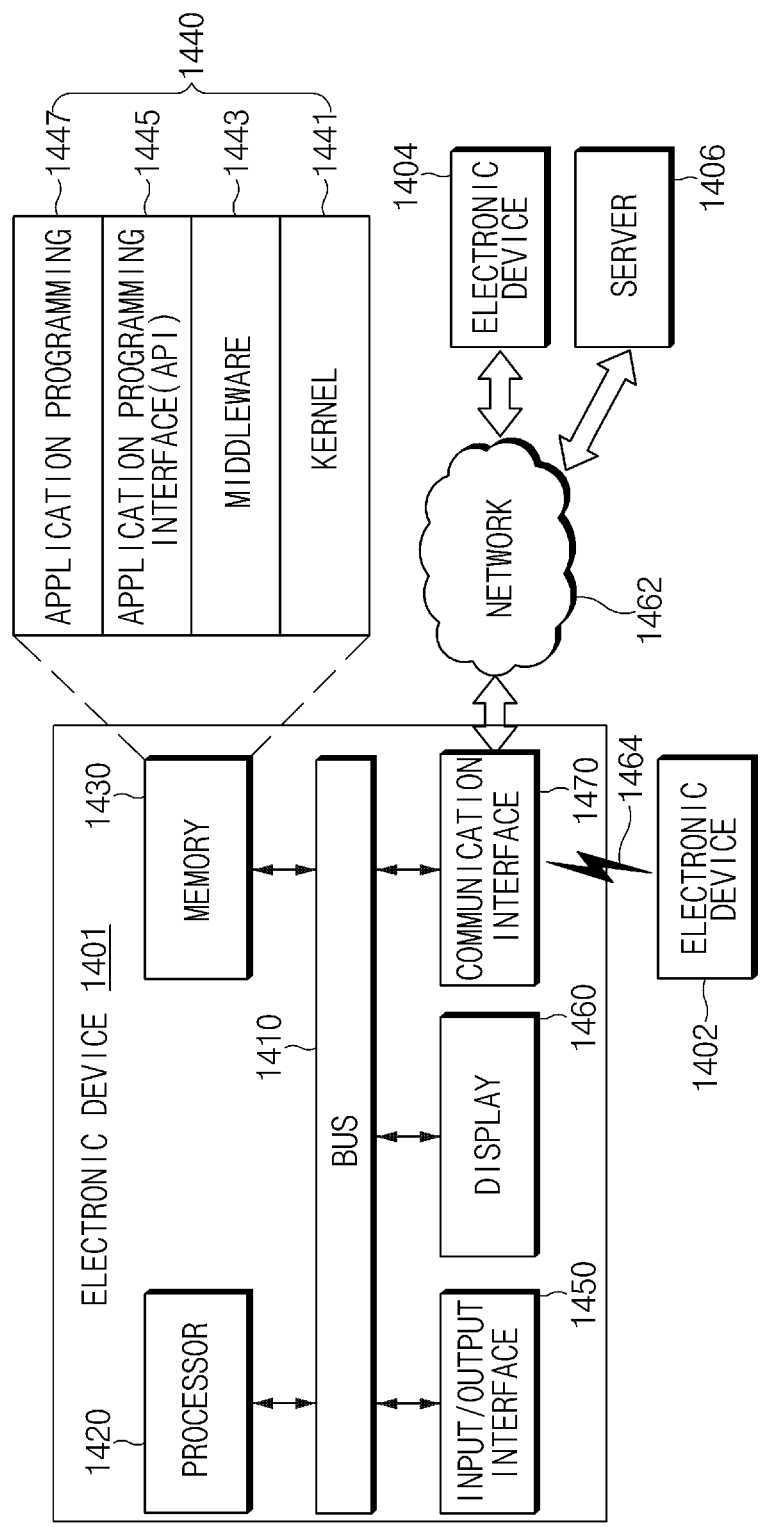
FIG. 14 illustrates an electronic device in a network environment according to an embodiment of the present disclosure.

FIG. 14 illustrates an electronic device in a network environment according to an embodiment of the present disclosure. For example, the electronic device of FIG. 14 may correspond to the electronic device 100, 200, 300, 400, or 500.

Referring to FIG. 14, the electronic device 1401, an electronic device 1402, an electronic device 1404, and a server 1406 are connected to each other through a network 1462 and/or a short range communication 1464. The electronic device 1401 includes a bus 1410, a processor 1420, a memory 1430, an input/output interface 1450, a display 1460, and a communication interface 1470. Alternatively, the electronic device 1401 may exclude at least one of the elements or may additionally include another element.

The bus 1410 may include a circuit that connects the components 1410 to 1470 and transfers communications (e.g., control messages and/or data) between the components.

The processor 1420 may include one or more of a central processing unit (CPU), an AP, or a CP. The processor 1420 may execute operations or data processing related to the control and/or communication of at least one other component of the electronic device 1401.

The memory 1430 may include a volatile and/or nonvolatile memory. The memory 1430 may store a command or data related to at least one other component of the electronic device 1401. The memory 1430 may store software and/or a program 1440. The program 1440 includes a kernel 1441, middleware 1443, an application programming interface (API) 1445, and an application program (or an application) 1447. At least some of the kernel 1441, the middleware 1443, or the API 1445 may be referred to as an operating system (OS).

The kernel 1441 may control or manage system resources (e.g., the bus 1410, the processor 1420, and the memory 1430) that are used to execute operations or functions implemented in the other programs (e.g., the middleware 1443, the API 1445, or the applications 1447). The kernel 1441 may provide an interface through which the middleware 1443, the API 1445, or the applications 1447 access individual components of the electronic device 1401 to control or manage the system resources.

The middleware 1443 may function as an intermediary for the API 1445 or the applications 1447 to communicate with the kernel 1441.

The middleware 1443 may process one or more work requests received from the application programs 1447, according to their priorities. For example, the middleware 1443 may give a priority, by which a system resource (e.g., the bus 1410, the processor 1420, or the memory 1430) of the electronic device 1401 may be used, to at least one of the application programs 1447. For example, the middleware 1443 may perform scheduling or load balancing for the one or more work requests by processing the one or more work requests according to the priority given to the at least one of the application programs 1047.

The API 1445 is an interface used by the application 1447 to control a function provided by the kernel 1441 or the middleware 1443, and may include at least one interface or function (e.g., an instruction), for example, for file control, window control, image processing, and text control.

The input/output interface 1450 may function as an interface that may transfer a command or data that are input from the user or another external device to another element (other elements) of the electronic device 1401. The input/output interface 1450 may output commands or data received from another component(s) of the electronic device 1401 to the user or anther external device.

The display 1460 may include an LCD, an LED display, an OLED display, a microelectromechanical system (MEMS) display, or an electronic paper display. The display 1460 may display various contents (e.g., a text, an image, a video, an icon, and a symbol). The display 1460 may include a touch screen and receive, for example, a touch, a gesture, a proximity, or a hovering input using an electronic pen or the user's body.

The communication interface 1470 may set a communication between the electronic device 1401 and the external electronic device 1402, the second external electronic device 1404, or the server 1406. For example, the communication interface 1470 may be connected to a network 1462 through a wireless communication or a wired communication to communicate with the second external electronic device 1404 or the server 1406.

The wireless communication is a cellular communication protocol, and may use at least one of long-term evolution (LTE), LTE-advanced (ATE-A), code division multiple access (CDMA), wideband CDMA (WCDMA), a universal mobile telecommunications system (UMTS), wireless broadband (WiBro), or a global system for mobile communications (GSM). Further, the wireless communication may include a short range communication 1464. The short range communication 1464 may include at least one of wireless fidelity (Wi-Fi), Bluetooth, near field communication (NFC), magnetic stripe transmission (MST), or a global navigation satellite system (GNSS).

An MST may generate a pulse according to transmission data by using an electromagnetic signal, and the pulse may generate a magnetic field signal. The electronic device 1401 may transmit the magnetic field signal to a point of sales (POS), detect the magnetic field signal by using an MST reader, and restore the data by converting the detected magnetic signal into an electrical signal.

The GNSS may include at least one of, for example, a global positioning system (GPS), a global navigation satellite system (Glonass), a Beidou navigation satellite system (hereinafter, "Beidou"), or the European global satellite-based navigation system (or Galileo), according to an in-use area or a bandwidth. The wired communication may include at least one of, for example, a universal serial bus (USB), a high definition multimedia interface (HDMI), recommended standard-232 (RS232), and a plain old telephone Service (POTS). The network 1462 may include at least one of communication networks, for example, a computer network (e.g. a LAN or a WAN), the Internet, or a telephone network.

The electronic devices 1402 and 1404 may be of the type that is the same as or different from that of the electronic device 1401. The server 1406 may include a group of one or more servers.

All or some of the operations executed by the electronic device 1401 may be executed by the electronic device 1402, the electronic device 1404, or the server 1406. For example, when the electronic device 1401 should execute some functions or services automatically or upon request, it may request at least some functions associated with the functions or services from the electronic device 1402, the electronic device 1404, and/or the server 1406, in place of or in addition to directly executing the functions or services. The other electronic device(s) may execute a requested function or an additional function, and may deliver the result to the electronic device 1401. The electronic device 1401 may process the received result directly or additionally, and may provide a requested function or service. To this end, for example, the cloud computing, distributed computing, or client-server computing technologies may be used.

Herein, the term "module" may indicate a unit including one of hardware, software, firmware, or a combination thereof. A module may be interchangeably used with a unit, a logic, a logical block, a component, or a circuit. A module may be a minimum unit or a part of an integrally configured part. A module may be a minimum unit or a part which performs one or more functions. A module may be implemented mechanically or electromagnetically. For example, a module may include at least one of an application-specific integrated circuit (ASIC) chip, a field-programmable gate array, or a programmable-logic device, which has been known, will be developed in the future, or performs certain operations.

At least some of the devices (e.g., modules or functions) or methods (e.g., operations) according to various embodiments may be implemented by an instruction stored in a computer-readable storage medium, for example, in the form of a program module. When the instruction is executed by the processor (e.g., the processor 1420), the at least one processor may perform a function corresponding to the instruction. The computer-readable storage medium may be the memory 1430.

The computer-readable storage medium may include a hard disk, a floppy disk, a magnetic medium (e.g., a magnetic tape), an optical medium (e.g., a compact disk read only memory (CD-ROM)), a digital versatile disk (DVD), a magneto-optical medium (e.g., a floptical disk), and a hardware device (e.g., a read only memory (ROM), a random access memory (RAM), or a flash memory). Further, the program instruction may include high-level language codes which may be executed by a computer using an interpreter as well as machine languages created by using a compiler. The above-mentioned hardware device may be configured to be operated as one or more software module to perform operations of various embodiments, and the converse is applied.

The module or program module according to various embodiments may include at least one of the above-mentioned elements, omit some of them, or further include other elements. The module, the program module, or the operations performed by other elements according to various embodiments may be performed in a sequential, parallel, iterative, or heuristic method. Further, some operations may be executed in another sequence or may be omitted, or other operations may be added.

According to various embodiments of the present disclosure, an electronic device having an improved design and an enhanced user experience may provide a wireless communication function without lowering the performance of the antenna by using a display expanded to the whole front surface or from the front surface to the side surfaces of the electronic device.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
    a housing including a first plate facing a first direction, a second plate facing a second direction opposite to the first direction, and a side plate facing a third direction perpendicular to the first direction and surrounding part of a space between the first plate and the second plate;
    a display positioned inside the housing and exposed through the first plate, the display facing the first direction;
    a first conductive plate attached to or integrated into the display, wherein the first conductive plate faces the first direction, and wherein the first conductive plate includes a first periphery extending along the side plate;
    a second conductive plate facing the third direction, wherein the second conducive plate includes a second periphery extending along the first periphery and wherein a portion of the second periphery is coupled to the first periphery; and
    a wireless communication circuit electrically connected to the second conductive plate,
    wherein the wireless communication circuit is configured to use at least one of the first conductive plate and the second conductive plate as an antenna element.

2. The electronic device of claim 1, wherein the side plate comprises a non-conductive material.

3. The electronic device of claim 1, further comprising a flexible printed circuit board (FPCB) including at least one of a conductive line and a conductive pattern that provides an electrical connection between the second conductive plate and the wireless communication circuit.

4. The electronic device of claim 3, wherein the FPCB further includes a first planar portion facing the third direction.

5. The electronic device of claim 4, wherein the FPCB further includes a second planar portion facing the first direction.

6. An electronic device, comprising:
    a cover window defining a front housing of the electronic device and at least a portion of a side housing of the electronic device;
    a flexible display panel disposed under the cover window, wherein the flexible display panel includes a first panel area corresponding to the front housing and a second panel area corresponding to at least a portion of the side housing;
    a conductive member including a first conductive plate disposed at a location corresponding to the first panel area of the display panel, a second conductive plate disposed at a location corresponding to the second panel area of the display panel, and a connection area connecting the first conductive plate and the second conductive plate only in a partial area;
    a flexible printed circuit board (FPCB) physically and electrically contacting the first plate and the second plate and for feeding electric power to the second conductive plate; and
    a wireless communication circuit electrically connected to the FPCB,
    wherein the wireless communication circuit is configured to use a slot defined by the second conductive plate, the connection area, and the first conductive plate as an antenna element.

7. The electronic device of claim 6, wherein content is output in the first panel area of the flexible display panel, and wherein the second panel area of the flexible display panel corresponds to a non-display area.

8. The electronic device of claim 6, further comprising a touch panel disposed between the first panel area of the flexible display panel and the cover window,
    wherein the touch panel is not to be located between the cover window and the second panel area.

9. The electronic device of claim 6, wherein the FPCB comprises:
    a first feeding line for feeding electric power from a first point placed on one side of the connection area to the second conductive plate; and
    a second feeding line for feeding electric power from a second point placed on the other side of the connection area to the second conductive plate.

10. The electronic device of claim 9, wherein the first feeding line, the second conductive plate, the connection area, and the first conductive plate constitute a first electrical path for receiving a signal of a first frequency band, and
    wherein the second feeding line, the second conductive plate, the connection area, and the first conductive plate constitute a second electrical path for receiving a signal of a second frequency band that is different from the first frequency band.

11. The electronic device of claim 6, further comprising a printed circuit board (PCB) including the wireless communication circuit or a processor electrically connected to the wireless communication,
    wherein the PCB is connected to the FPCB.

12. The electronic device of claim 6, wherein content is output in the first panel area of the flexible display panel and at a portion of the second panel area of the flexible display panel, and
    wherein a remaining portion of the second panel area corresponds to a non-display area.

13. An electronic device, comprising:
    a cover window defining a front housing of the electronic device;
    a display panel disposed under the cover window, wherein the display panel includes a first panel area having a first width and a first height and a second panel area having a second width and a second height;
    a conductive member including a first conductive plate disposed at a location corresponding to the first panel area of the display panel, a second conductive plate disposed at a location corresponding to the second panel area of the display panel, and a connection area connecting the first conductive plate and the second conductive plate only in an area;
    a flexible printed circuit board (FPCB) physically and electrically contacting the first plate and the second plate and for feeding electric power to the second conductive plate; and
    a wireless communication circuit electrically connected to the FPCB, wherein the wireless communication circuit is configured to use a slot defined by the second conductive plate, the connection area, and the first conductive plate as an antenna element.

14. The electronic device of claim 13, wherein the first panel area and the second panel area are logically distinguished from each other in one display panel, and
wherein the first panel area and the second panel area are spaced apart from each other by a gap.

15. The electronic device of claim 14, comprising a display driving circuit electrically connected to the display panel,
wherein the display driving circuit is configured not to output content in the gap.

16. The electronic device of claim 13, wherein a pixel density in the gap in the display panel is lower than a pixel density in the first panel area or the second panel area.

17. The electronic device of claim 13, wherein the first panel area and the second panel area are physically distinguished from each other, and
wherein the first panel area and the second panel area are spaced apart from each other by a space.

18. The electronic device of claim 17, comprising:
a first display driving circuit corresponding to the first panel area; and
a second display driving circuit electrically connected to the second panel area,
wherein the first display driving circuit outputs an execution screen of an application in the first panel area,
wherein the second display driving circuit outputs a specific screen in the second panel area, and
wherein the wireless communication circuit is further configured to use the second conductive plate as an antenna radiator.

19. The electronic device of claim 13, further comprising a metal frame constituting at least a portion of a side housing of the electronic device,
wherein the second conductive plate is electrically connected to the metal frame.

20. The electronic device of claim 13, further comprising a lumped element disposed between the first conductive plate and the second conductive plate.

* * * * *